US006423425B1

(12) United States Patent
Faucher et al.

(10) Patent No.: US 6,423,425 B1
(45) Date of Patent: Jul. 23, 2002

(54) ARTICLE HAVING A CHIP-RESISTANT ELECTRODEPOSITED COATING AND A PROCESS FOR FORMING AN ELECTRODEPOSITED COATING

(75) Inventors: Philippe Faucher, Lavallois-Perret (FR); Gregory J. McCollum, Gibsonia, PA (US); Robert R. Zwack, Allison Park, PA (US); Michael J. Pawlik, Glenshaw, PA (US); Ellor James Van Buskirk, Wexford, PA (US); Victor G. Corrigan, North Olmsted, OH (US)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/611,051

(22) Filed: Jul. 6, 2000

Related U.S. Application Data

(63) Continuation-in-part of application No. 09/309,851, filed on May 11, 1999, now Pat. No. 6,248,225.
(60) Provisional application No. 60/086,693, and provisional application No. 60/086,707, filed on May 26, 1998.

(51) Int. Cl.$^7$ .............................................. B32B 15/06
(52) U.S. Cl. ........................ 428/626; 204/484; 204/506
(58) Field of Search ..................... 428/626; 204/484, 204/506

(56) References Cited

U.S. PATENT DOCUMENTS

| 1,873,945 | A | 8/1932 | Kraenzlein et al. |
| 3,236,895 | A | 2/1966 | Lee et al. ................... 260/584 |
| 3,455,806 | A | 7/1969 | Spoor et al. ................ 204/181 |
| 3,488,272 | A | 1/1970 | Frisch et al. ............... 204/181 |
| 3,663,389 | A | 5/1972 | Koral et al. ................ 204/181 |
| 3,674,671 | A | 7/1972 | Stromberg ................... 204/181 |
| 3,749,657 | A | 7/1973 | Le Bras et al. ............. 204/181 |
| 3,793,278 | A | 2/1974 | De Bona et al. ...... 260/29.2 EP |
| 3,917,570 | A | 11/1975 | Chang et al. ........... 260/75 TN |
| 3,928,157 | A | 12/1975 | Suematsu et al. .......... 204/181 |
| 3,947,338 | A | 3/1976 | Jerabek et al. ............. 204/181 |
| 3,947,339 | A | 3/1976 | Jerabek et al. ............. 204/181 |
| 3,954,899 | A | 5/1976 | Chang et al. ............... 260/849 |
| 3,962,165 | A | 6/1976 | Bosso et al. .......... 260/29.2 EP |
| 3,962,522 | A | 6/1976 | Chang et al. ............... 428/423 |
| 3,975,346 | A | 8/1976 | Bosso et al. .......... 260/29.2 EP |
| 3,984,299 | A | 10/1976 | Jerabek ....................... 204/181 |
| 3,984,922 | A | 10/1976 | Rosen ................................ 35/4 |
| 4,001,101 | A | 1/1977 | Bosso et al. ................ 204/181 |
| 4,018,849 | A | 4/1977 | Chang et al. ................ 260/849 |

(List continued on next page.)

FOREIGN PATENT DOCUMENTS

| CA | 1329291 | 5/1994 |
| CA | 2222803 | 12/1996 |
| DE | 2 707 405 | 1/1978 |
| DE | 4125459 | 2/1993 |
| DE | 19529394 | 2/1996 |
| DE | 19519665 | 9/1996 |
| DE | 19530226 C2 | 2/1997 |
| DE | 19642970 | 4/1997 |
| DE | 19628361 A1 | 1/1998 |
| DE | 19716334 A1 | 4/1998 |
| DE | 19709467 C1 | 10/1998 |
| EP | a 12 463 | 6/1980 |
| EP | 0 089 497 | 9/1983 |
| EP | 0274389 A1 | 7/1988 |
| EP | 0185338 | 5/1989 |
| EP | 0 402 181 | 12/1990 |
| EP | 0421247 | 4/1991 |
| EP | 0426327 A2 | 5/1991 |
| EP | 0 548 845 | 6/1993 |
| EP | 0739954 | 10/1996 |

(List continued on next page.)

OTHER PUBLICATIONS

*Paint & Ink International*, "Latest Trends in Electrodeposition Paints", R. D. Kanolkar, 1995, pp. 4, 6–7.
"Elektrotauchlackierung mit russgefüllten System", Guder et al., 1987, pp. 539–545.
"Mehrfach–Elektrotauchlackierung mit Hilfe von russgefüllten Systemen", Streitberger et al., pp. 177–189.
"Electrocoagulation of Waterborne Polymers in the Presence of Carbon Black", Makromol. Chem., Macromol, Symp. 8, 285–322 (1987).
"Two–Coat Electrocoat", Focus: Electrodeposition of Paint, Products Finishing (Oct. 1992) pp. 54–59.
"Conductive primers and other EDP advances" by S. E. Stromberg, Industrial Finishing.
Beck et al., *Makromol. Chem., Macromol. Symp. 8*, "Electrocoagulation of Waterborne Polymers in the Presence of Carbon Black", 1987, pp. 285–322.
Products Finishing, *Focus: Electrodeposition of Paint*, "Two–Coat Electrocoat", M. Todd, Oct. 1992, pp. 54–59.
*Industrial Finishing*, "Conductive Primers and Other EDP Advances", Stromberg.
Electrocoat '92 Conference—Focusing on the Electrodeposition of Paint, "Two–Coat Electrocoat as Applied to Distribution Transformers", M. Todd, Mar. 1992.
Electrocoat '96® Conference—The Environomic Solution, "Paint Innovations, Two–Coat Electrocoat", D. Knudtson, Mar. 1996, pp. 19–1 through 19–15.

(List continued on next page.)

Primary Examiner—Kishor Mayekar
(74) Attorney, Agent, or Firm—Deborah M. Altman; William J. Uhl

(57) ABSTRACT

An electrodeposition process is provided for applying an elastomeric thermosetting, film-forming polymer to a corrosion-resistant electrically conductive substrate that is free of an electrodeposited coating. The elastomeric polymer typically is a polyurethane, a polyurea or a poly(urethane urea). The film-forming coating applied by this process provides chip resistance to the substrate. A coated article that is prepared according to the process is also provided.

43 Claims, No Drawings

U.S. PATENT DOCUMENTS

| | | |
|---|---|---|
| 4,034,017 A | 7/1977 | Chang et al. ............ 260/859 R |
| 4,066,591 A | 1/1978 | Scriven et al. ........ 260/29.2 TN |
| 4,115,226 A | 9/1978 | Zwack et al. ............ 204/181 C |
| 4,116,900 A | 9/1978 | Belanger ................. 260/18 EP |
| 4,134,866 A | 1/1979 | Tominaga et al. ....... 260/18 PN |
| 4,134,932 A | 1/1979 | Kempter et al. ............. 260/831 |
| 4,139,672 A | 2/1979 | Ozawa et al. ................. 428/323 |
| 4,147,676 A | 4/1979 | Pampouchidis ......... 260/23 TN |
| 4,147,679 A | 4/1979 | Scriven et al. ........ 260/29.2 TN |
| 4,176,099 A | 11/1979 | Pampouchidis et al. 260/18 TN |
| 4,182,828 A | 1/1980 | Reischl et al. ................. 528/69 |
| 4,197,224 A | 4/1980 | Schmolzer et al. ...... 260/22 TN |
| 4,208,262 A | 6/1980 | Kubo et al. ............... 204/181 T |
| 4,222,837 A | 9/1980 | Hazan .................... 204/181 C |
| 4,229,335 A | 10/1980 | Ting et al. ............. 260/29.4 R |
| 4,259,163 A | 3/1981 | Suzuki et al. ............. 204/181 T |
| 4,315,840 A | 2/1982 | Kempter et al. ......... 260/18 TN |
| 4,373,013 A | 2/1983 | Yoshizumi ................... 428/570 |
| 4,375,498 A | 3/1983 | Le Minez et al. ........... 428/416 |
| 4,382,114 A | 5/1983 | Höhlein et al. .......... 428/423.1 |
| 4,389,509 A | 6/1983 | Pampouchidis et al. .... 524/591 |
| 4,397,990 A | 8/1983 | Kooymans et al. ......... 525/167 |
| 4,419,467 A | 12/1983 | Wismer et al. ............... 523/414 |
| 4,421,620 A | 12/1983 | Kaylo et al. ............ 204/181 C |
| 4,423,166 A | 12/1983 | Moriarity et al. ............ 523/414 |
| 4,427,820 A | 1/1984 | Backhouse et al. ......... 524/504 |
| 4,431,764 A | 2/1984 | Yoshizumi ................... 524/409 |
| 4,452,830 A | 6/1984 | Yoshizumi ................... 427/215 |
| 4,457,965 A | 7/1984 | Rocholl et al. .............. 428/141 |
| 4,468,307 A | 8/1984 | Wismer et al. ......... 204/181 C |
| 4,477,536 A | 10/1984 | Wright et al. ............... 428/522 |
| 4,489,135 A | 12/1984 | Drexler et al. ............ 428/423.1 |
| 4,522,958 A | 6/1985 | Das et al. ..................... 523/212 |
| 4,526,910 A | 7/1985 | Das et al. ..................... 523/220 |
| 4,544,687 A | 10/1985 | Schupp et al. ............... 523/414 |
| 4,558,090 A | 12/1985 | Drexler et al. ............... 524/591 |
| 4,563,372 A | 1/1986 | Kurauchi et al. ............ 427/409 |
| 4,569,966 A | 2/1986 | Piccirilli et al. ............. 524/589 |
| 4,576,979 A | 3/1986 | Schupp et al. ............... 523/404 |
| 4,598,111 A | 7/1986 | Wright et al. .................. 524/40 |
| 4,608,416 A | 8/1986 | Schupp et al. ............... 525/130 |
| 4,623,690 A | 11/1986 | Patzschke et al. ........... 524/538 |
| 4,624,801 A | 11/1986 | Kawaguchi et al. ......... 252/500 |
| 4,652,470 A | 3/1987 | Das et al. ................. 427/407.1 |
| 4,677,004 A | 6/1987 | Das et al. ................. 427/407.1 |
| 4,692,382 A | 9/1987 | Schmitt et al. .............. 428/414 |
| 4,692,383 A | 9/1987 | Schmitt et al. .............. 428/414 |
| 4,728,543 A | 3/1988 | Kurauchi et al. ......... 427/407.1 |
| 4,728,545 A | 3/1988 | Kurauchi et al. ............ 427/409 |
| 4,755,418 A | 7/1988 | DebRoy et al. ............. 428/215 |
| 4,755,434 A | 7/1988 | Fujii et al. ................... 428/461 |
| 4,757,113 A | 7/1988 | Paar .......................... 525/124 |
| 4,761,212 A | 8/1988 | Watanabe et al. ........ 204/181.1 |
| 4,761,337 A | 8/1988 | Guagliardo et al. ...... 428/425.8 |
| 4,781,808 A | 11/1988 | Geist et al. ............... 204/181.7 |
| 4,789,566 A | 12/1988 | Tatsuno et al. ........... 427/388.2 |
| 4,793,867 A | 12/1988 | Charles et al. ........... 148/6.15 Z |
| 4,812,492 A | 3/1989 | Eckes et al. ................. 523/351 |
| 4,814,208 A | 3/1989 | Miyazaki et al. ............ 427/402 |
| 4,818,356 A | 4/1989 | Geist et al. ............... 204/181.1 |
| 4,840,715 A | 6/1989 | Misawa et al. ........... 204/181.1 |
| 4,872,961 A | 10/1989 | McIntyre et al. ......... 204/181.7 |
| 4,882,090 A | 11/1989 | Batzill et al. ................. 252/511 |
| 4,882,228 A | 11/1989 | Nakahama .................. 428/421 |
| 4,888,244 A | 12/1989 | Masubuchi et al. ......... 428/416 |
| 4,891,111 A | 1/1990 | McCollum et al. ...... 204/181.7 |
| 4,894,261 A | 1/1990 | Gulbins et al. .............. 427/379 |
| 4,911,811 A | 3/1990 | Mullaney, Jr. ......... 204/192.14 |
| 4,916,019 A | 4/1990 | Nakatani et al. ............ 428/418 |
| 4,917,955 A | 4/1990 | Porter, Jr. et al. .......... 428/413 |
| 4,933,214 A | 6/1990 | Sugiura et al. .............. 427/379 |
| 4,959,277 A | 9/1990 | Saeki et al. .................. 428/623 |
| 4,968,399 A | 11/1990 | Tsuchiya et al. .......... 204/181.1 |
| 4,974,307 A | 12/1990 | Uebayashi et al. ............ 29/460 |
| 4,981,759 A | 1/1991 | Nakatani et al. ............. 428/626 |
| 4,988,420 A | 1/1991 | Batzill et al. ............. 204/181.1 |
| 4,990,579 A | 2/1991 | Paar ........................... 525/528 |
| 5,011,733 A | 4/1991 | Hiraki et al. ................ 428/336 |
| 5,021,502 A | 6/1991 | Patzschke et al. ........... 524/591 |
| 5,047,294 A | 9/1991 | Schwab et al. ........... 428/432.1 |
| 5,047,493 A | 9/1991 | Schipfer et al. ............... 528/45 |
| 5,059,652 A | 10/1991 | Schmolzer et al. ......... 524/591 |
| 5,096,555 A | 3/1992 | Schupp et al. ............ 204/181.7 |
| 5,104,507 A | 4/1992 | Offenburger .............. 204/180.6 |
| 5,104,583 A | 4/1992 | Richardson ................. 252/518 |
| 5,114,756 A | 5/1992 | Mirabeau et al. ............ 427/379 |
| 5,116,912 A * | 5/1992 | Lindert et al. ............... 525/340 |
| 5,130,004 A | 7/1992 | Johnson et al. ........... 204/181.7 |
| 5,132,180 A | 7/1992 | Kishi et al. .................. 428/457 |
| 5,178,736 A | 1/1993 | Richardson .............. 204/181.1 |
| 5,186,813 A | 2/1993 | Helms ........................ 205/171 |
| 5,188,716 A | 2/1993 | Schwerzel et al. ........ 204/181.7 |
| 5,203,975 A | 4/1993 | Richardson .............. 204/181.1 |
| 5,212,273 A | 5/1993 | Das et al. ................. 526/323.1 |
| 5,229,210 A | 7/1993 | Kasukawa et al. .......... 428/416 |
| 5,236,564 A | 8/1993 | Berg et al. ................ 204/181.1 |
| 5,242,716 A | 9/1993 | Iwase et al. .............. 427/407.1 |
| 5,258,424 A | 11/1993 | Yagi et al. ................... 523/221 |
| 5,275,707 A | 1/1994 | Yamada et al. ........... 204/181.1 |
| 5,294,265 A * | 3/1994 | Gray et al. .................. 148/250 |
| 5,294,665 A | 3/1994 | Pedain et al. ................ 524/591 |
| 5,298,148 A | 3/1994 | Yasuoka et al. ............... 205/50 |
| 5,327,596 A | 7/1994 | Kasari et al. ................ 427/379 |
| 5,328,579 A | 7/1994 | Kasukawa et al. ........ 204/181.1 |
| 5,334,650 A | 8/1994 | Serdiuk et al. .............. 524/591 |
| 5,346,958 A | 9/1994 | Yukawa et al. ............. 525/124 |
| 5,352,733 A | 10/1994 | Hart ........................... 524/840 |
| 5,376,457 A | 12/1994 | Smith ......................... 428/457 |
| 5,378,735 A | 1/1995 | Hosokawa et al. ........... 522/79 |
| 5,385,655 A | 1/1995 | Brent et al. .............. 204/181.1 |
| 5,385,656 A | 1/1995 | Doebler et al. .......... 204/181.1 |
| 5,389,219 A | 2/1995 | Zwack et al. ............ 204/181.1 |
| 5,389,406 A | 2/1995 | Doebler et al. .......... 427/407.1 |
| 5,395,659 A | 3/1995 | Gräf et al. ................ 427/407.1 |
| 5,425,970 A | 6/1995 | Lahrmann et al. .......... 427/493 |
| 5,439,710 A | 8/1995 | Vogt et al. ................ 427/407.1 |
| 5,483,012 A | 1/1996 | Midogohchi et al. ........ 525/459 |
| 5,507,928 A | 4/1996 | Bohmert et al. ............. 204/488 |
| 5,525,650 A | 6/1996 | Clark et al. .................. 523/400 |
| 5,543,084 A | 8/1996 | Kinlen et al. ................ 252/500 |
| 5,552,227 A | 9/1996 | Göldner ................... 428/423.1 |
| 5,556,518 A | 9/1996 | Kinlen et al. ................ 204/484 |
| 5,556,527 A | 9/1996 | Igarashi et al. .............. 204/488 |
| 5,588,989 A | 12/1996 | Vonk et al. .............. 106/14.12 |
| 5,589,228 A | 12/1996 | Wegner et al. ........... 427/407.1 |
| 5,630,922 A | 5/1997 | Eswarakrishnan et al. .. 204/499 |
| 5,633,297 A | 5/1997 | Valko et al. ................. 204/500 |
| 5,658,970 A * | 8/1997 | Harris et al. ................. 204/499 |
| 5,663,244 A | 9/1997 | Barancyk et al. ........... 525/456 |
| 5,674,560 A | 10/1997 | Tanigami et al. ............ 427/202 |
| 5,676,813 A | 10/1997 | Nakamura et al. ............. 205/50 |
| 5,686,012 A | 11/1997 | Hayashi et al. ........... 252/62.56 |
| 5,698,310 A | 12/1997 | Nakamura et al. .......... 428/328 |
| 5,698,330 A | 12/1997 | Bederke et al. ........... 428/423.1 |
| 5,709,950 A | 1/1998 | Burgman et al. ......... 428/423.1 |
| 5,721,018 A | 2/1998 | Göldner et al. ........... 427/407.1 |
| 5,731,089 A | 3/1998 | Kunikiyo et al. ......... 428/423.1 |
| 5,733,962 A | 3/1998 | Osaka et al. ................ 524/449 |
| 5,767,191 A | 6/1998 | Zawacky et al. .............. 24/591 |
| 5,837,766 A | 11/1998 | Metro et al. ................. 524/495 |
| 5,849,855 A | 12/1998 | Usui et al. ..................... 528/45 |

| | | | |
|---|---|---|---|
| 5,863,646 A | 1/1999 | Verardi et al. | 428/323 |
| 5,869,198 A | 2/1999 | Erne et al. | 428/626 |
| 5,882,734 A | 3/1999 | Blum et al. | 427/407.1 |
| 5,908,667 A | 6/1999 | Blum et al. | 427/407.1 |
| 5,914,162 A | 6/1999 | Bilkadi | 428/35.8 |
| 5,945,499 A | 8/1999 | Ohrbom et al. | 528/75 |
| 5,998,504 A | 12/1999 | Groth et al. | 523/213 |
| 6,126,730 A * | 10/2000 | Yoshida et al. | 106/14.41 |

FOREIGN PATENT DOCUMENTS

| | | |
|---|---|---|
| EP | 0823289 | 2/1998 |
| EP | 0828568 B1 | 3/1998 |
| FR | 2335270 | 7/1977 |
| FR | 2 373 594 | 8/1978 |
| GB | 1309356 | 3/1973 |
| GB | 2129807 A | 5/1984 |
| GB | 2 249 496 | 5/1992 |
| GB | 2295335 A | 5/1996 |
| GB | 2297049 A | 7/1996 |
| JP | 52-140551 | 11/1977 |
| JP | 53108138 | 9/1978 |
| JP | 55-11175 | 1/1980 |
| JP | 57048367 | 3/1982 |
| JP | 60-7716 | 2/1985 |
| JP | 60-150870 | 8/1985 |
| JP | 61-149497 | 7/1986 |
| JP | 62061675 | 3/1987 |
| JP | 63-134696 | 6/1988 |
| JP | 63274799 | 11/1988 |
| JP | 63-317695 | 12/1988 |
| JP | 64-4663 | 1/1989 |
| JP | 2104698 | 4/1990 |
| JP | 2228376 | 9/1990 |
| JP | 54-1335 | 12/1991 |
| JP | 3-296567 | 12/1991 |
| JP | 5-43696 | 2/1993 |
| JP | 5-15533 | 3/1993 |
| JP | 5-51553 | 3/1993 |
| JP | 5065416 | 3/1993 |
| JP | 93202715 | 7/1993 |
| JP | 6-15223 | 1/1994 |
| JP | 6-57496 | 3/1994 |
| JP | 6-65759 | 3/1994 |
| JP | 6-65760 | 3/1994 |
| JP | 6057496 | 3/1994 |
| JP | 7-41994 | 2/1995 |
| JP | 7-62214 | 3/1995 |
| JP | 9125286 | 5/1997 |
| JP | 9-165450 | 6/1997 |
| JP | 2667883 | 10/1997 |
| JP | 9324292 | 12/1997 |
| JP | 10008291 | 1/1998 |
| JP | 2759216 | 5/1998 |
| WO | WO86/03791 | 7/1986 |
| WO | WO91/12899 | 9/1991 |
| WO | WO96/38235 | 12/1996 |
| WO | WO 97/47401 | 12/1997 |
| WO | WO97/47402 | 12/1997 |
| WO | WO98/07527 | 2/1998 |
| WO | WO99/06158 | 2/1999 |
| ZA | 96/4394 | 5/1996 |
| ZA | 96/4395 | 5/1996 |

OTHER PUBLICATIONS

*Industrial Paint & Powder*, "Two–Coat E–coat Doubles Durability", T. Triplett, 1997.
*Electrocoat '98—The Environomic Solution*, Why Double Electrocoat and Powder?, T. Hager, pp. 18–1 through 18–11.
*Volume 2: Finished Products*, "Outlines of Paint Technology", W. M. Morgans, pp. 116–119.
"The Chemistry of Silica", R. K. Iler, 1979, pp. 412–414.
Automotive Finishes (slide); presentation by PPG Industries, Inc.
PPG Power Prime® Technical Bulletin, Two–Coat Protection, The Primer–Surfacer Alternative.
Copies of overhead projector slides re: "Six" and "Seven Year Technology", Jan. 17, 1992 (Exhibit 1).
PPG Chrysler Electrocoat Development Update Meeting Report by M. Mulligan (Exhibit 2).
Material–Konzept by Mercedes Benz (1994) discussing PPG's DuoPrime process.
Results of Delamination Tests, Jul. 14, 1994 (Exhibit 3).
Technical Update to General Motors by PPG—A "Common"Focus (Sep. 24, 1994) (Exhibit 4).
Chrysler Technical Update by PPG, Oct. 26–27, 1994 (Exhibit 5).
Transcription of Chrysler Technical Update, Oct. 26–27, 1994 (Exhibit 5).
GM Electrocoat Technical Review slides, Nov. 24, 1994 (Exhibit 6).
Memo Confirming the Meeting with GM on Nov. 22, 1994 and lists the attendees from GM, dated Dec. 1994 (Exhibit 6).
*Proceedings of the 1991 IEEE Power Engineering Society—Transmission and Distribution Conference,*"Application of Two Coat Cathodic Electrodeposition to Pole Mounted Distribution Transformers", M. Todd, pp. 582–585.
Technical Update to Ford, Feb. 9, 1995 (Exhibit 7).
General Motors Technology Update, Feb. 1995 (Exhibit 8).
Letter from Matthew Plaza of PPG to Ford Motor Company confirming meeting of Mar. 22, 1995 (Mar. 16, 1996) (Exhibit 9).
Letter from Ford's representative to PPG personnel re: Minutes of PPG–Ford Chip Dip Meeting on Mar. 22 1995 (Apr. 26, 1995) (Exhibit 10).
Redacted Internal PPG Correspondence dated Apr. 18, 1995 re: GM Electrocoat Update, (Exhibit 11).
Allowed claims for EP 0839073 (Appln. No. 96919803.5).
Journal of the American Chemical Society, vol. 49, p. 3181 (1927).
Advances in Polyurethane Technology, Buist et al, p. 88 (1968).

* cited by examiner

ARTICLE HAVING A CHIP-RESISTANT ELECTRODEPOSITED COATING AND A PROCESS FOR FORMING AN ELECTRODEPOSITED COATING

CROSS-REFERENCE TO RELATED APPLICATIONS

This application is a Continuation-in-Part of U.S. patent application Ser. No. 09/309,851, filed May 11, 1999, now U.S. Pat. No. 6,248,225, and claims the benefit of U.S. Provisional Application Serial Nos. 60/086,693 and 60/086,707, filed May 26, 1998, which are hereby incorporated by reference.

BACKGROUND

The present invention is directed to an article, such as an automobile body, that is electrocoated with a chip-resistant coating and a process for electrodepositing a chip-resistant coating on a substrate.

Multi-layered coating composites find use in various industries including the coating and/or painting of motor vehicles. In several of these industries, and in the automotive industry in particular, a substrate can have from two to six or more coating layers. These coating layers protect the substrate and provide a decorative finish.

Multi-layered coating composites for metal substrates often use electrodeposition coatings as an initial resinous coating layer to protect the metal substrate from corrosion. Cationic electrodeposition coatings have become the coatings of choice for corrosion protection. Electrodeposition has become increasingly important in the coatings industry because, by comparison with non-electrophoretic coating means, electrodeposition offers higher paint utilization, outstanding corrosion protection, low environmental contamination, and a highly automated process.

A spray-applied chip resistant coating layer is often present in multi-layered coating composites for motor vehicles. The chip resistant layer protects the surface of the substrates from losing paint through chipping when the vehicle is hit with solid debris, such as gravel and stones. The art for achieving chip resistance from spray applied primer coatings has postulated that reducing the differential in impact energy between the multiple coating layers should improve chip resistance of the coating. This is especially applicable when coating layers have excessive difference of hardness between them. This reduction in the differential would lessen delamination between the coatings, such as between an undercoat and an intermediate coat or between a top coat and an intermediate coat.

SUMMARY OF THE INVENTION

An object of the present invention is to provide a coating system having both good chip resistance and corrosion protection, while additionally providing efficiencies in application and processing through the elimination of a paint layer. These efficiencies include superior paint utilization, lower environmental contamination, and a highly automated process.

The present invention includes a coated article that comprises a corrosion-resistant electrically conductive substrate that is free of an electrodeposited coating and an electrodeposited film-forming composition applied to at least a portion of the surface of the corrosion-resistant electrically conductive substrate. The film forming composition includes a curable electrodepositable elastomeric polymer.

The substrate typically is one of aluminum or alloys thereof, zinc or zinc alloy surface treated steel, such as galvanized steel, that is coated with a non-insulating layer of a zinc-rich or iron phosphide-rich organic coating. The present invention also includes a process for electrocoating a corrosion-resistant electrically conductive substrate which is free of an electrodeposited coating, including the step of electrodepositing a coating composition onto a surface of the electrically conductive substrate, the coating composition including a curable elastomeric polymer.

The corrosion-resistant substrate combined with an elastomeric electrodeposited coating performs as well or better than a less corrosion-resistant substrate coated with an electrodeposited corrosion-resistant primer followed by a spray-applied primer-surface layer. The above-described coating aids in 1) bonding the finished layer(s) to the substrate, 2) preventing chipping damage, 3) leveling defects in the substrate and providing a uniform under-layer, 4) protecting repairs and cut edges, and 5) resisting damage due to exposure to ultraviolet light.

DETAILED DESCRIPTION OF THE INVENTION

The use of numerical values in the various ranges specified in this application, unless expressly indicated otherwise, are stated as approximations as though the minimum and maximum values within the stated ranges were both preceded by the word "about." In this manner slight variations above and below the stated ranges can be used to achieve substantially the same results as values within the ranges. Also, the disclosure of these ranges is intended as a continuous range including every value between the minimum and maximum values.

The present invention is directed to a coated article, typically an automobile body that includes a corrosion-resistant, electrically conductive substrate that has been coated with one or more layers of a film-forming composition. The corrosion-resistant substrate can be inherently corrosion-resistant, such as aluminum, or a substrate, such as a ferrous substrate, that has been rendered corrosion-resistant by application of a suitable pretreatment composition. The film-forming layer(s) include a layer that contains a curable, film-forming elastomeric polymer that is electrodeposited onto the corrosion-resistant, electrically conductive substrate. The elastomeric polymer preferably is a curable polyurethane, polyurea or poly(urethane-urea) that typically is the reaction product of a polyisocyanate and an active hydrogen-containing polymeric material. The active hydrogen-containing polymeric material preferably is a polyoxyalkylene ether polyol, a polyoxyalkylenepolyamine or a mixture thereof. The elastomeric polymer preferably contains a minimum amount of polyurea linkages when cured.

Corrosion-resistant conductive substrates include, without limitation, metal substrates such as stainless steel; zinc or zinc alloy surface treated steel, that is coated with a zinc-rich or iron phosphide-rich organic coating; aluminum; copper; magnesium or alloys thereof. By "surface treated" it is understood that the surface of the steel has a zinc or zinc alloy layer that is introduced by a variety of known processes such as by, without limitation galvanizing or cladding the steel substrate. The substrate can be treated with a phosphating solution such as a zinc phosphating solution as described in U.S. Pat. No. 5,588,989. Combinations or composites of ferrous and/or non-ferrous metals also can be used, such as GALVALUME, GALVANNEAL and GALFAN zinc-aluminum alloys.

The terms "corrosion-resistant," and the like, refer to the relative resistance of the substrate to corrosion as compared to cold rolled steel. By "non insulating" it is meant that a coating does not interfere in any substantial way with the electrodeposition of the film-forming composition of the present invention (i.e., render the electrodeposited layer commercially unacceptable).

The pre-treatment composition also may be a solution that comprises one or more Group IIIB or IVB element-containing compounds or mixtures thereof solubulized or dispersed in a carrier medium, typically an aqueous medium. The Group IIIB and IVB elements are defined by the CAS Periodic Table of the Elements as shown, for example, in the Handbook of Chemistry and Physics, (60th Ed. 1980). Transition metal compounds and rare earth metal compounds typically are compounds of zirconium, titanium, hafnium, yttrium and cerium and mixtures thereof. Typical zirconium compounds may be selected from hexafluorozirconic acid, alkali metal and ammonium salts thereof, ammonium zirconium carbonate, zirconyl nitrate, zirconium carboxylates and zirconium hydroxy carboxylates such as hydrofluorozirconic acid, zirconium acetate, zirconium oxalate, ammonium zirconium glycolate, ammonium zirconium lactate, ammonium zirconium citrate, and mixtures thereof. Hexafluorozirconic acid is preferred. An example of a yttrium compound is yttrium nitrate. An example of a titanium compound is fluorotitanic acid and its salts. An example of a hafnium compound is hafnium nitrate. An example of a cerium compound is cerous nitrate. Preferably, the Group IIIB or IVB metal compounds are in the form of metal salts or acids which are water soluble. The Group IIIB or IVB metal compound is typically present in the carrier medium in an amount of 10 to 5000 ppm metal, preferably 100 to 300 ppm metal.

The pretreatment composition carrier also may contain a film-forming resin. Suitable resins include reaction products of one or more alkanolamines and an epoxy-functional material containing at least two epoxy groups, such as those disclosed in U.S. Pat. No. 5,653,823. Preferably, such resins contain beta-hydroxy ester, imide, or sulfide functionality, incorporated by using dimethylolpropionic acid, phthalimide, or mercaptoglycerine as an additional reactant in the preparation of the resin. Alternatively, the reaction product is that of the diglycidyl ether of Bisphenol A (commercially available from Shell Chemical Company as EPON 880), dimethylol propionic acid, and diethanolamine in a (0.6 to 5.0):(0.05 to 5.5:1) mole ratio. Other suitable resins include water soluble and water dispersible polyacrylic acids such as those as disclosed in U.S. Pat. Nos. 3,912,548 and 5,328,525; phenol-formaldehyde resins as described in U.S. Pat. No. 5,662,746, incorporated herein by reference; water soluble polyamides such as those disclosed in WO 95/33869; copolymers of maleic or acrylic acid with allyl ether as described in Canadian patent application 2,087,352; and water soluble and dispersible resins including epoxy resins, aminoplasts, phenol-formaldehyde resins, tannins, and polyvinyl phenols as discussed in U.S. Pat. No. 5,449,415.

In one embodiment, the pretreatment composition includes a film-forming resin that is present in an amount of 0.005% to 30% based on the total weight of the pretreatment composition, and the above-described Group IIIB or IVB metal compound in an amount of 10 to 5000, preferably 100 to 1000, ppm metal based on total weight of the pretreatment composition. The weight ratio of the resin to Group IIIB or IVB metal or metal compound is from 2.0 to 10.0, preferably 3.0 to 5.0, based on the Group IIIB or IVB metal.

Non-ferrous or ferrous substrates can be pretreated with a non-insulating layer of organophosphates or organophosphonates such as those described in U.S. Pat. Nos 5,294,265 and 5,306,526, which are incorporated herein by reference. Such organophosphate or organophosphonate pretreatments are available commercially from PPG Industries, Inc. under the trade name NUPAL®. Application to the substrate of a non-conductive coating, such as NUPAL, typically is followed by the step of rinsing the substrate with deionized water prior to the coalescing of the coating. This ensures that the layer of the non-conductive coating is sufficiently thin to be non-insulating.

The pretreatment coating composition can further comprise surfactants that function as aids to improve wetting of the substrate. Generally, the surfactant materials are present in an amount of less than about 2 weight percent on a basis of total weight of the pretreatment coating composition. Other optional materials in the carrier medium include defoamers and substrate wetting agents.

Preferably, the pretreatment coating composition is essentially free of chromium-containing materials, i.e., the composition contains less than about 2 weight percent of chromium-containing materials (expressed as $CrO_3$), and more preferably less than about 0.05 weight percent of chromium-containing materials. Examples of such chromium-containing materials include chromic acid, chromium trioxide, chromic acid anhydride, dichromate salts such as ammonium dichromate, sodium dichromate, potassium dichromate, and calcium, barium, magnesium, zinc, cadmium and strontium dichromate. Most preferably, the pretreatment coating composition is free of chromium-containing materials.

In a typical pre-treatment process, before depositing the pre-treatment composition upon the surface of the metal substrate, it is preferred to remove foreign matter from the metal surface by thoroughly cleaning and degreasing the surface. The surface of the metal substrate can be cleaned by physical or chemical means, such as by mechanically abrading the surface or cleaning/degreasing with commercially available alkaline or acidic cleaning agents which are well know to those skilled in the art, such as sodium metasilicate and sodium hydroxide. A non-limiting example of a preferred cleaning agent is CHEMKLEEN® 163, an alkaline-based cleaner commercially available from PPG Pretreatment and Specialty Products of Troy, Mich. Following the cleaning step, the metal substrate is usually rinsed with water in order to remove any residue. The metal substrate can be air-dried using an air knife, by flashing off the water by brief exposure of the substrate to a high temperature or by passing the substrate between squeegee rolls. The pretreatment coating composition can be deposited upon at least a portion of the outer surface of the metal substrate. Preferably, the entire outer surface of the metal substrate is treated with the pretreatment composition. The thickness of the pretreatment film can vary, but is generally less than about 1 micrometer, preferably ranges from about 1 to about 500 nanometers, and more preferably ranges from about 10 to about 300 nanometers.

When the substrate comprises an aluminum alloy it is particularly important to avoid over-cleaning the substrate with cleaning agents such as CHEMKLEEN® 163, and the like. It is postulated, without any intention of being bound by this theory, that the over cleaning of the substrate with these agents damages the surface of the substrate, resulting in the exposure of and/or the release of Fe and Cu, which adversely affects the quality of the chip-resistant layer. A typical non-damaging time range for the exposure of the substrate to these cleaning agents is from one to two minutes. Damage to the surface of the substrate can be monitored empirically by taking gloss readings of the subsequent baked electrocoated layer. For example, it has been determined that typical aluminum alloys should not be treated for more than two minutes with the commercially available CHEMKLEEN® CK166HP/CK171 product (PPG Pretreatment and Specialty Products of Troy Mich.).

The pretreatment coating composition is applied to the surface of the metal substrate by any conventional application technique, such as by spraying, immersion or roll coating in a batch or continuous process. The temperature of the pretreatment coating composition at application is typically about 10° C. to about 85° C., and preferably about 15° C. to about 60° C. The pH of the preferred pretreatment coating composition at application generally ranges from about 2.0 to about 5.5, and is preferably about 3.5 to about 5.5. The pH of the medium may be adjusted using mineral acids such as hydrofluoric acid, fluoroboric acid, phosphoric acid, and the like, including mixtures thereof; organic acids such as lactic acid, acetic acid, citric acid, sulfamic acid, or mixtures thereof, and water soluble or water dispersible bases such as sodium hydroxide, ammonium hydroxide, ammonia, or amines such as triethylamine, methylethyl amine, or mixtures thereof.

Continuous processes typically are used in the coil coating industry and also for mill application. The pretreatment coating composition can be applied by any of these conventional processes. For example, in the coil industry, the substrate typically is cleaned and rinsed and then contacted with the pretreatment coating composition by roll coating with a chemical coater. The treated strip is then dried by heating, painted and baked by conventional coil coating processes.

Mill application of the pretreatment composition can be by immersion, spray or roll coating applied to the freshly manufactured metal strip. Excess pretreatment composition is typically removed by wringer rolls. After the pretreatment composition has been applied to the metal surface, the metal can be rinsed with deionized water and dried at room temperature or at elevated temperatures to remove excess moisture from the treated substrate surface and cure any curable coating components to form the pretreatment coating. Alternately, the treated substrate can be heated at about 65° C. to about 125° C. for about 2 to about 30 seconds to produce a coated substrate having a dried residue of the pretreatment coating composition thereon. If the substrate is already heated from the hot melt production process, no post application heating of the treated substrate is required to facilitate drying. The temperature and time for drying the coating will depend upon such variables as the percentage of solids in the coating, components of the coating composition and type of substrate.

The film coverage of the residue of the pretreatment composition generally ranges from about 1 to about 10,000 milligrams per square meter (mg/m$^2$), and is preferably about 10 to about 400 mg/m$^2$.

A layer of a weldable primer also may be applied to the substrate, whether or not the substrate is pretreated. Preferably the substrate is pretreated. A typical weldable primer is BONAZINC®, a zinc-rich mill applied organic film-forming composition, which is commercially available from PPG Industries, Inc., Pittsburgh, Penn. BONAZINC® typically is applied to a thickness of at least/micrometer and preferably to a thickness of about 34 micrometers. Other weldable primers, such as iron phosphide-rich primers, are commercially available.

The chip-resistant film coating of the present invention is then applied to the corrosion-resistant electrically conductive substrate. The coating is electrodeposited from a composition that includes an ionic, elastomeric polymer, typically a polyurea, a polyurethane or a poly(urethane-urea). The elastomeric polymer typically is the reaction product of a polyisocyanate and an active hydrogen-containing polymer that is one of a polyester, a polyether, an acrylic polymer or combinations thereof. For example, the elastomeric polymer can be the reaction product of a polyisocyanate and an active hydrogen-containing polymer that is a polyester or polyether, preferably a polyoxyalkylene ether polyol, a polyoxyalkylenepolyamine or a mixture thereof. A suitable active hydrogen-containing polymer has a Tg of less than 0° C. and a number average molecular weight of 400–4000. Examples of suitable active hydrogen-containing polymer (polyols) are described in U.S. Pat. No. 4,154,891. The Tg for many polymers, including polyethers are available in the literature and/or are determinable by well-known methods, such as by differential scanning calorimetry. Also helpful in determining the Tg is the Clash-Berg method (ASTM D-1043, a method for determination of the stiffness characteristics of plastics over a wide temperature range by direct measurement of the apparent modulus of rigidity). The elastomeric polymer typically has a flexibilizing segment content of from 30 to 100, preferably from 40 to 60. The flexibilizing segment content is determined in accordance with Example 1 part D.

The elastomeric polymer is ionic to permit electrodeposition of a resin formed therefrom. The ionic resin can be anionic or cationic, but preferably is cationic, the composition including the ionic resin being cationically electrodepositable. The elastomeric polymer typically has a weighted average molecular weight (Mw) of less than 100,000, preferably less than 50,000 and most preferably from 10,000 to 40,000. The elastomeric polymer also typically has active hydrogen functionality, i.e., hydroxyl, primary or secondary amine, and typically has an active hydrogen equivalent weight of 800 to 2,500 grams per equivalent. The molecular weight of the elastomeric polymer and other polymeric materials used in the practice of the invention is determined by gel permeation chromatography using a polystyrene standard. The elastomeric polymer preferably is essentially aliphatic to render the polyurethane or polyurea less susceptible to damage by UV radiation. By "essentially aliphatic" it is meant that the backbone of the elastomeric polymer contains no more than 50% by weight aromatic groups or moieties (i.e., the total weight of multivalent phenyl groups, such as phenylene (($M_w$=76), in the backbone)), preferably no more than 20% by weight aromatic groups, most preferably no more than 5% by weight aromatic groups and optimally <1% by weight aromatic groups. The percentage by weight of aromatic groups (A%) can be determined by the following formula:

$$A\% = W_a/W_t \times 100\%$$

where $W_a$ is the weight of aromatic groups in the aromatic group-containing reactant, which is the weight of the aromatic group-containing reactant multiplied by the fraction of the total weight of the aromatic group-containing reactant that is aromatic, which can be calculated as follows:

(76×the number of aromatic rings in the aromatic group-containing reactant)/molecular weight of the aromatic group-containing reactant.

$W_t$ is the total weight of the reactants less the total weight of materials lost to volatilization during the synthesis and cure of the polymer. If more than one reactant contains aromatic groups, A % for each reactant can be added (i.e., A $\%_1 + A \%_2 = A \%_{total}$)

The elastomeric polymer typically is a polyurethane, a polyurea or a poly(urethane-urea). The elastomeric polymer preferably includes a minimum amount of urea linkages in its cured state. Typically, the minimum amount of urea linkages are greater than about 0.50 meq/g of cured film, preferably greater than about 0.60 meq/g of cured film and most preferably greater than about 1.00 meq/g of cured film. The meq/gram can be determined by determining the total meqs of urea linkages formed divided by the total weight in grams of the reactants used in preparing the polymer minus the weight of molecules lost, for example, by volatilization, in curing the film. For example, a polymer prepared from reactants containing 2 equivalents of isocyanate, 1 equivalent of amine and 1 equivalent of hydroxyl groups in 1000 grams of reactants would contain 1 equivalent of urea linkages and 1 equivalent of urethane linkages per 100 grams of cured film (assuming no loss of volatile molecules), which is the equivalent of 1 meq of urea linkages per gram of cured film. In practice, it is found that films that contain a minimum percent of urea linkages are more stable under typical baking (curing) temperatures, as compared to urethane linkages, which are less tolerant of overbaking.

Polyurethanes and polyureas typically are produced by reacting a polyisocyanate and an active hydrogen-containing polymer. Suitable polyisocyanates useful for preparing the elastomeric polymer include those that have aliphatically-, cycloaliphatically-, araliphatically- and/or aromatically-bound isocyanate groups. Preferably, the polyisocyanate is aliphatic or cycloaliphatic.

Examples of aliphatic and cycloaliphatic polyisocyanates include 4,4-methylenebisdicyclohexyl diisocyanate (hydrogenated MDI), hexamethylene diisocyanate (HDI) (i.e., 1,6-hexamethylene diisocyanate), isophorone diisocyanate (IPDI), methylenebis(cyclohexyl isocyanate), cyclohexylene diisocyanate (hydrogenated XDI) and isocyanurates thereof.

Examples of aromatic polyisocyanates include tolylene diisocyanate (TDI) (i.e., 2,4-tolylene diisocyanate, 2,6-tolylene diisocyanate or a mixture thereof), diphenylmethane-4,4-diisocyanate (MDI), naphthalene-1,5-diisocyanate (NDI), 3,3-dimethyl-4,4-biphenylene diisocyanate (TODI), crude TDI (i.e., a mixture of TDI and an oligomer thereof), polymethylenepolyphenyl polyisocyanate, crude MDI (i.e., a mixture of MDI and an oligomer thereof), xylylene diisocyanate (XDI) and phenylene diisocyanate.

Polyisocyanate derivatives prepared from hexamethylene diisocyanate, 1-isocyanato-3,3,5-trimethyl-5-isocyanatomethylcyclohexane, including isocyanurates thereof, and/or 4,4'-bis(isocyanatocyclohexyl)methane are suitable.

The amount of polyisocyanate used to make the elastomeric polymer is typically from 10 to 60, preferably 20 to 50 percent by weight based on total weight of the reactants used to make the elastomeric polymer.

The active hydrogen-containing material for reaction with the polyisocyanate to form the cationic or anionic polyurethane comprises one or more active hydrogen-containing polymers. These materials preferably have an average active hydrogen functionality ranging from about 2 to 8, preferably from about 2 to 4, a number average molecular weight ranging preferably from about 400 to 10,000, more preferably from 400 to 4,000, and a glass transition temperature (Tg) of 0° C. or less. Polyether polyols or polyamines are preferred. Polyether polyamines are most preferred.

The term "active hydrogen" means those groups which are reactive with isocyanates as determined by the Zerewitnoff test as is described in the *Journal Of The American Chemical Society*, Vol. 49, page 3181 (1927). Preferably, the active hydrogens are hydroxyl, primary amine and secondary amine. Most preferably, the active hydrogens are amines.

Examples of polyether polyols are polyalkylene ether polyols that include those having the following structural formula:

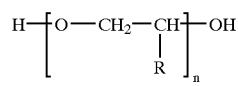

where the substituent R is hydrogen or lower alkyl containing from 1 to 5 carbon atoms including mixed substituents, and n is typically from 5 to 200. Included are, without limitation, poly(oxytetramethylene) glycols, poly(oxyethylene) glycols, poly(oxy-1,2-propylene) glycols and the reaction products of ethylene glycol with a mixture of 1,2-propylene oxide and ethylene oxide. These materials are obtained by the polymerization of alkylene oxides such as ethylene oxide, propylene oxide and tetrahydrofuran.

Also, polyethers obtained from the oxyalkylation of various polyols, for example, diols such as 1,6-hexanediol or higher polyols such as trimethylolpropane and sorbitol, can be used. One commonly utilized oxyalkylation method is the reacting of a polyol with alkylene oxide such as ethylene or propylene oxide in the presence of an acidic or basic catalyst.

Examples of polyamines are polyoxyalkylene polyamines. The preferred polyamines are polyoxyalkylene polyamines of the structure:

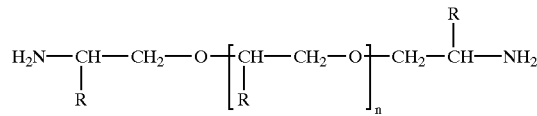

wherein R can be the same or different and is selected from the class consisting of hydrogen, lower alkyl radicals having from 1 to 6 carbon atoms, and n represents an integer of from about 1 to 50, preferably 1 to 35. A number of such polyoxyalkylene polyamines are described in more detail in U.S. Pat. No. 3,236,895, column 2, lines 40–72; methods of preparation of the polyoxyalkylene polyamines are illustrated in the patent in Examples 4, 5, 6 and 8–12 in columns 4 to 9 thereof; the aforementioned portions of U.S. Pat. No. 3,236,895 hereby being incorporated by reference.

Mixed polyoxyalkylene polyamines can be used, that is, those in which the oxyalkylene group can be selected from more than one moiety. Examples are polyoxyethylene-propylene polyamines such as those having the following structural formula:

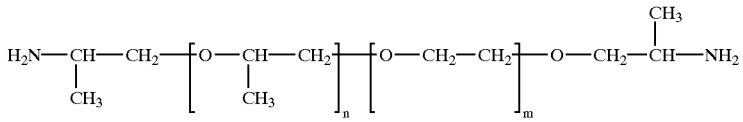

wherein n+m is equal to 1 to 50, preferably 1 to 35, m is equal to 1 to 49, preferably 1 to 34, and n is equal to 1 to 34.

Besides the polyoxyalkylene polyamines mentioned above, derivatives of polyoxyalkylene polyamines or polyols also may be usable. Examples of suitable derivatives are aminoalkylene derivatives which are prepared by reacting polyoxyalkylene polyamines or polyols such as those mentioned above with acrylonitrile followed by hydrogenation of the reaction product. An example of a suitable derivative is that of the following structural formula:

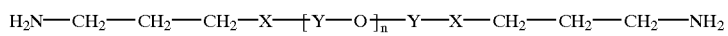

wherein X is O or NH, Y is a $C_{1-6}$ alkylene group and n is 1–50.

In one particular embodiment, the polyoxyalkylene polyamine is polyoxytetramethylene diamine, which typically is the hydrogenation product of cyanoethylated polyoxytetramethylene diol (obtained from polyoxytetramethylene diol and acrylonitrile).

Therefore, in the practice of the invention, where the expression "polyoxyalkylene polyamines" is used, what is intended are polyamines containing both oxyalkylene groups and at least two amine groups, preferably primary amine groups, per molecule. Primary amines are considered to be monofunctional when reacting with isocyanate groups to form a urea linkage.

Preferred active hydrogen-containing polyethers are polyoxytetrahylene diols or diamines, such as polytetrahydrofuran and polyoxypropylene diamine or mixed polyoxyethylene-propylene diamines. Polyoxypropylene diamine and polyoxytetramethylene diamine are most preferred.

The polyether segment can be derived from a single polyether polyol or polyamine or various blends thereof. Preferred are blends of polyether polyols such as polyoxytetramethylene diol and polyether polyamines such as polyoxypropylene diamine polyoxytetramethylene diamine or in weight ratios of 0.5–10:1, preferably 1 to 7:1.

Besides active hydrogen-containing polyethers, other active hydrogen-containing materials can be reacted with the polyisocyanate to provide the elastomeric segment. To produce polyurethanes, examples include polycarbonate diols, polyester diols, hydroxyl-containing polydiene polymers, hydroxyl-containing acrylic polymers, and mixtures thereof. To produce polyureas, examples include without limitation, polycarbonated amines, polydienediamines and iminated polyester.

Examples of polyester polyols and hydroxyl-containing acrylic polymers are described in U.S. Pat. Nos. 3,962,522 and 4,034,017, respectively. Examples of polycarbonate polyols are described in U.S. Pat. No. 4,692,383 in col. 1, line 58 to col. 4, line 14. Examples of hydroxyl-containing polydiene polymers are disclosed in U.S. Pat. No. 5,863,646, col. 2, lines 11–54. These polymeric polyols will have number average molecular weights of from 400 to 10,000, preferably from 400 to 3,000.

The amount of the active hydrogen-containing polymer that is used to prepare the elastomeric polymer is at least 30 percent by weight, preferably at least 35 percent by weight, and more preferably from 35 to 50 percent by weight based on total weight of the reactants used to make the elastomeric polymer.

Low molecular weight active hydrogen-containing materials, such as polyols or polyamines having two to four hydroxyl or amine groups and molecular weights of less than 400, preferably less than 250 and most preferably between 62 and 250, also can be included as reactants for preparing the polyurethane. Specific examples include, without limitation, alkylene diols having 1 to 10 carbon atoms such as ethylene glycol, 1,2-propylene glycol, 1,4-butanediol, ethylene diamine, hexamethylene diamine, trimethylolpropane, glycerol, pentaerythritol and sorbitol. Examples of other low molecular weight polyols are ether polyols such as diethylene glycol and ethoxylated Bisphenol A.

The low molecular weight polyols or polyamines are used in amounts up to 30 percent by weight, preferably from 0.5 to 10 percent by weight based on weight of the reactants used to make the elastomeric polymer.

The elastomeric polymer formed from the reaction of the polyisocyanate and the active hydrogen-containing material typically contains ionizable groups, which can be ionized to solubilize the polymer in water, or groups can be reacted with an ionizable material to form an ionizable group. For the purposes of this invention, the term "ionizable" means a group capable of becoming ionic, i.e., capable of dissociating into ions or becoming electrically charged. The ionizable moiety can be provided as a group present on the active hydrogen-containing material or as part of a second active hydrogen-containing material that is co-reacted with, or attached to, the active hydrogen-containing compound and the polyisocyanate. A preferred embodiment is a cationic polyurea that is substantially free of polyurethane linkages.

For the cationic polymers, the ionizable moiety typically is a tertiary amine group that can be incorporated into the polymer by reaction of the polymer with a co-reactive material containing the ionizable moiety (the tertiary amine group). The amine is neutralized with acid to form an amine salt group. Such compounds include aminoalcohols such as dimethylaminoethanol, dimethylaminopropanol, aminopropyldiethanolamine, diethylaminopropylamine, hydroxyalkylmorpholine like hydroxyethylmorpholine, and hydroxyalkylpiperazine like hydroxyethylpiperazine, and the like and mixtures thereof. The amount of amine introduced into the polymer typically is that sufficient to give 0.1 to 1, preferably 0.2 to 0.5 milliequivalents (meqs) of amine per gram of resin solids as determined by titration.

In a further embodiment, the elastomeric polymer can be prepared to include pendant epoxy groups, i.e., by the use of glycidol as an active hydrogen-containing compound, which can be reacted with a tertiary amine in the presence of an organic acid to form a quaternary amonium group or with a sulfide, such as thiodiethanol, in the presence of an organic acid to form a sulfonium group. A method for forming quaternary amonium groups is described in U.S. Pat. No. 5,908,912. A method for forming sulfonium groups is described in U.S. Pat. Nos. 3,793,278 and 3,959,106.

For the anionic polymer, the ionizable moiety is an acid group which typically is incorporated into the polymer by reaction with an active hydrogen-containing compound. The acid is neutralized with base to form the anionic salt group. Examples of anionic groups are $-OSO_3^-$, $-COO^-$, $-OPO_3^=$, $-SO_2O^-$, $-POO^-$; and $PO_3^=$, with $COO^-$ being preferred.

Suitable materials for introducing acid groups into the anionic polymer are hydroxy and mercapto carboxylic acids. Specific examples include dimethylolpropionic acid, which is preferred, glycolic acid and lactic acid. Other examples of compounds which contain active hydrogens and acid groups are amino carboxylic acids, amino hydroxy carboxylic acids, sulfonic acids, hydroxy sulfonic acids and amino sulfonic acids. Examples include oxaluric acid, anilido acetic acid, glycine, 6-amino-caprylic acid, reaction product of ethanolamine and acrylic acid, hydroxyethylpropionic acid, 2-hydroxy-ethane sulfonic acid and sulphanilic acid. Amino acids must be used in the presence of base such as potassium hydroxide or a tertiary amine. The amount of acid incorporated into the polymer typically is that sufficient to give the polymer 0.1 to 1, preferably 0.2 to 0.5 meqs of acid per gram of resin solids as determined by titration.

The amine or the acid groups are neutralized with acid and base, respectively. Neutralization can range from 0.1 to 1.0, preferably 0.4 to 0.8, of the total theoretical neutralization equivalent.

For the cationic polymers, suitable neutralizing agents are organic acids such as acetic acid, boric acid, hydroxyacetic acid, propionic acid, lactic acid, formic acid, tartaric acid, sulfamic acid and dimethylolpropionic acid that is preferred, as well as inorganic acids such as sulfuric acid, hydrochloric acid and phosphoric acid.

For anionic polymers, suitable neutralizing agents include inorganic and organic bases such as sodium hydroxide, potassium hydroxide, ammonia and amines. Suitable amines include alkanolamines such as monoethanolamine, diethanolamine, dimethylaminoethanol, triethanolamine, diisopropanolamine, triisopropanolamine, and the like; alkylamines such as diethylamine, triethylamine, diisopropylamine, tributylamine and the like; trimethylamine, diethylmethylamine, methyldiethanolamine, triethanolamine, and the like. The appropriate amount of the neutralizing agent is about 0.1 to 1.0 times, preferably 0.4 to 0.8 times the total theoretical neutralization equivalent.

To achieve optimum chip resistance and durability, the elastomeric polymer is curable, or thermosetting. As such, the polymer is electrodeposited with a curing or crosslinking agent such as a capped or blocked isocyanate, which is preferred for cationic compositions, or an aminoplast, which is preferred for anionic compositions.

The polyisocyanate may be fully capped with essentially no free isocyanate groups and present as a separate component or it may be partially capped and reacted with active hydrogen-containing groups, such as hydroxyl or amine groups in the elastomeric polymer backbone. Examples of suitable polyisocyanates and capping agents are those described in U.S. Pat. No. 3,947,339. Fully capped polyisocyanates are described in U.S. Pat. No. 3,984,299.

The polyisocyanate can be an aliphatic, cycloaliphatic or an aromatic polyisocyanate or a mixture of the two. Diisocyanates are preferred, although higher polyisocyanates can be used in place of, or in combination with, diisocyanates. Aliphatic or cycloaliphatic polyisocyanates are preferred.

Examples of suitable aliphatic diisocyanates are straight chain aliphatic diisocyanates such as 1,4-tetramethylene diisocyanate and 1,6-hexamethylene diisocyanate. Also, cycloaliphatic diisocyanates can be employed. Examples include isophorone diisocyanate and 4,4'-methylene-bis-(cyclohexyl isocyanate). Examples of suitable aromatic diisocyanates are p-phenylene diisocyanate, diphenylmethane-4,4'-diisocyanate and 2,4- or 2,6-toluene diisocyanate. Examples of suitable higher polyisocyanates are triphenylmethane-4,4',4"-triisocyanate, 1,2,4-benzene triisocyanate and polymethylene polyphenyl isocyanate. Biurets and isocyanurates of diisocyanates, including mixtures thereof, such as the isocyanurate of hexamethylene diisocyanate, the biuret of hexamethylene diisocyanate, and the isocyanurate of isophorone diisocyanate are also suitable.

Isocyanate prepolymers, for example, reaction products of polyisocyanates with polyols such as neopentyl glycol and trimethylol propane or with polymeric polyols such as polycaprolactone diols and triols (NCO/OH equivalent ratio greater than one) can also be used.

Any suitable aliphatic, cycloaliphatic, or aromatic alkyl monoalcohol or phenolic compound may be used as a capping agent for the capped polyisocyanate crosslinking agent in the composition of the present invention including, for example, lower aliphatic alcohols such as methanol, ethanol, and n-butanol; cycloaliphatic alcohols such as cyclohexanol; aromatic-alkyl alcohols such as phenyl carbinol and methylphenyl carbinol; and phenolic compounds such as phenol itself and substituted phenols wherein the substituents do not affect coating operations, such as cresol and nitrophenol. Glycol ethers also may be used as capping agents. Suitable glycol ethers include ethylene glycol butyl ether, diethylene glycol butyl ether, ethylene glycol methyl ether and propylene glycol methyl ether.

Other suitable capping agents include oximes such as methyl ethyl ketoxime, acetone oxime and cyclohexanone oxime, lactams such as epsilon-caprolactam, and amines such as dibutylamine.

Examples of other blocked polyisocyanates include triazine compounds having the formula $C_3N_3(NHCOXR)_3$, wherein X is nitrogen, oxygen, sulfur, phosphorus, or carbon, and R is an alkyl group having one to twelve, preferably one to four, carbon atoms, or mixtures of such alkyl groups. X is preferably oxygen or carbon, more preferably oxygen. R preferably has one to eight carbon atoms, for example, methyl, ethyl, n-propyl, isopropyl, butyl, n-octyl and 2-ethylhexyl. R preferably is a mixture of methyl and butyl groups. Such compounds, and the preparation thereof, are described in detail throughout U.S. Pat. No. 5,084,541, incorporated herein by reference. Examples of triazine compounds are tris carbamoyl triazine or 1,2,5 triazine-2,4,6 tris-carbamic acid esters. When used, the triazine curing agent is present in the film-forming composition in an amount ranging from 1 to 40 eight percent, preferably from 1 to 20 weight percent, more preferably 1 to 10 percent by weight based on the total weight of resin solids in the film-forming composition.

The polyisocyanate crosslinking agent typically is present in the thermosetting compositions of the present invention in an amount of at least 10 percent by weight, preferably at least 15 percent by weight, based on total resin solids weight of the composition. The polyisocyanate crosslinking agent typically is also present in the composition in an amount of less than 60 percent by weight, preferably less than 50 percent by weight, and more preferably less than 40 percent by weight, based on total resin solids weight of the composition. The amount of crosslinling agent present in the thermosetting composition of the present invention may range between any combination of these values, inclusive of the recited values.

The equivalent ratio of hydroxyl groups in the polymer to reactive functional groups in the crosslinking agent is typically within the range of 1:0.5 to 1.5, preferably 1.0 to 1.5.

Aminoplasts typically are obtained from the reaction of formaldehyde with an amine or amide. The most common amines or amides are melamine, urea, or benzoguanamine, and are preferred. However, condensates with other amines or amides can be used; for example, aldehyde condensates of glycoluril, which give a high melting crystalline product which is useful in powder coatings. While the aldehyde used most often is formaldehyde, other aldehydes such as acetaldehyde, crotonaldehyde, and benzaldehyde may be used.

The aminoplast contains methylol groups and preferably at least a portion of these groups are etherified with an alcohol to modify the cure response. Any monohydric alcohol may be employed for this purpose including methanol, ethanol, butanol, isobutanol, and hexanol.

Preferably, the aminoplasts are melamine-, urea-, glycouril- or benzoguanamine-formaldehyde condensates etherified with an alcohol containing from one to four carbon atoms.

The aminoplast is present in the electrodepositable composition in amounts of 5 to 60, preferably 15 to 50 percent by weight based on weight of resin solids. Adjuvant quantities of the above-described polyisocyanate crosslinker, also may be present in the composition.

Usually the thermosetting composition also will contain catalysts to accelerate the cure of the crosslinking agent with reactive groups on the polymer(s). Suitable catalysts for aminoplast cure include acids such as acid phosphates and sulfonic acid or a substituted sulfonic acid. Examples include dodecylbenzene sulfonic acid, paratoluene sulfonic acid, and the like. Suitable catalysts for isocyanate cure include organotin compounds such as dibutyltin oxide, dioctyltin oxide, dibutyltin dilaurate, and the like. The catalyst is usually present in an amount of about 0.05 to about 5.0 percent by weight, preferably about 0.08 to about 2.0 percent by weight, based on the total weight of resin solids in the thermosetting composition.

Optional ingredients such as pigments can be present in the elastomeric polymer-containing compositions. Particularly suitable pigments include hiding pigments such as titanium dioxide, zinc oxide, antimony oxide, etc. and organic or inorganic UV opacifying pigments such as iron oxide, transparent red or yellow iron oxide, carbon black phthalocyanine blue, and the like. Pigments can be present in amounts of up to 35 parts by weight or less based on 100 parts by weight of total solids of the electrodepositable composition.

Other optional ingredients are anti-oxidants, UV-absorbers and hindered amine light stabilizers, such as for example, hindered phenols, benzophenones, benzotriazoles, triazoles, triazines, benzoates, piperidinyl compounds and mixtures thereof, such as those described in U.S. Pat. No. 5,260,135, which is incorporated herein by reference. These ingredients are typically added in amounts up to about 2% based on the total weight of resin solids of the electrodepositable composition. Other optional ingredients include co-solvents, coalescing aids, defoamers, plasticizers, bactericides and the like.

The aqueous cationic or anionic polymer dispersions typically are electrodeposited onto the substrate from an electrodeposition bath having a solids content of 5 to 50 percent by weight. The bath temperature is usually about 15° C. to 35° C. The voltage is from 100 to 400 V (load voltage) using the substrate to be coated as a cathode in the case of the cationic polymer or as an anode in the case of the anionic polymer. The film thickness of the electrodeposited coating is not particularly restricted and can vary largely depending upon the application of the finished product, etc. However, the thickness is usually between 3 to 70 microns, particularly 15 to 35 microns in terms of cured film thickness. The baking and curing temperature of the coating film is usually from 100° C. to 250° C. and preferably 140° C. to 200° C.

The electrocoating compositions are in the form of an aqueous dispersion. The term "dispersion" is believed to be a two-phase transparent, translucent or opaque resinous system in which the resin is in the dispersed phase and the water is in the continuous phase. The average particle size of the resinous phase is generally less than 1.0 and usually less than 0.5 microns, preferably less than 0.15 micron.

The concentration of the resinous phase in the aqueous medium is at least 1 and usually ranges from about 2 to about 60 percent by weight based on total weight of the aqueous dispersion.

In the process of applying the film coating, the aqueous dispersion of the electrodepositable composition is placed in contact with an electrically conductive anode and cathode. Upon passage of an electric current between the anode and cathode, an adherent film of the electrodepositable composition will deposit in a substantially continuous manner on either the anode or the cathode depending on whether the composition is anionically or cationically electrodepositable. Electrodeposition is usually carried out at a constant voltage in the range of from about 1 volt to several thousand volts, typically between 50 and 500 volts. Current density is usually between about 1.0 ampere and 15 amperes per square foot (10.8 to 161.5 amperes per square meter).

Additional film-forming layer(s) may be applied to the chip-resistant film-forming layer of the present invention. These layers include, without limitation, colorcoat and topcoat (clearcoat) layers. These additional layer(s) may be applied by any of the known methods for applying such coatings such as, without limitation, by spraying or dipping.

Illustrating the invention are the following Examples which, however, are not to be considered as limiting the invention to their details. All parts and percentages in the following Examples as well as throughout the specification are by weight unless otherwise indicated.

EXAMPLES

Several chip resistant thermosetting polyurethane electrodepositable coating compositions were prepared as shown in the following Examples.

Example 1

Part A—Preparation of Anionic Polyurethane Resins

Anionic polyurethane resins were prepared from the materials listed in Table 1. All parts and percentages are by weight unless otherwise indicated.

TABLE 1

|  | All PolyTHF[1] (I) | Blend of polyTHF and JEFFAMINE (II) | Blend of PPO[2] and JEFFAMINE (III) |
|---|---|---|---|
| Polymeg 1000[3] | 53.34 | 34.66 | — |
| Niax 1025[4] polypropyleneglycol | — | — | 34.77 |
| Isophoronediisocyanate | 31.77 | 33.54 | 33.41 |
| Jeffamine D-2000[5] | — | 8.02 | 7.99 |
| Propoxylated trimethylolpropane[6] (pTMP) | — | 12.97 | 12.89 |
| Dimethylolpropionic acid | 5.57 | 5.68 | 5.66 |
| Trimethylolpropane | 6.05 | — | — |
| Propylene glycol | 3.27 | 3.05 | 3.21 |
| 1,4 butanediol | — | 2.08 | 2.08 |
| Dibutyltindilaurate | 0.02 | 0.02 | 0.02 |
| Methylisobutylketone (MIBK) | 25 | 25 | 25 |

[1]polytetrahydrofuran
[2]polypropylene oxide
[3]polytetrahydrofuran, 1,000 molecular weight, available from Great Lakes Chemical, Corp., West Lafayette, Indiana.
[4]A polyoxyethylenediamine of 2000 molecular weight available from Huntsman Corporation.
[5]polypropylene glycol, 1000 molecular weight, available from Arco Chemical Co. of Newton Square, Pennsylvania as PPG-1025
[6]TS-30, available from Perstorp Polyols, Inc. Toledo, Ohio.

Preparation of Example 1(I), 1(II) and 1(III)

For Example 1(I) of Table 1, isophoronediisocyanate (929.1 g, 8.37 equivalents "eq"), dibutyltindilaurate (0.58 grams "g"), and methylisobutyl ketone (145.6 g) were charged to a round bottom flask. The solution was heated to 50° C. At 50° C., Polymeg®1000 ("PolyTHF") (1,535.4 g, 3.07 eq) and MIBK (402.3 g) were added dropwise at a rate such that the temperature did not exceed 90° C. The reaction was held at 72° C. for 45 minutes after the addition was complete and an isocyanate eq. wt. of 571 was obtained. At 72° C., dimethylolpropionic acid (162.8 g, 2.43 eq) and MIBK (7.5 g) were added and the reaction was held at 90° C. for an anticipated isocyanate equivalent weight of 1135. At the anticipated equivalent weight ("eq wt"), propylene glycol (95.8 g, 2.52 eq), trimethylolpropane (177 g, 5.21 eq), and MIBK (168.9 g) were added and the reaction was held until no isocyanate remained (as determined by IR).

Generally the polyurethane resins of 1(II) and 1(III) were prepared in a similar manner to that of 1(I). Exceptions were that for 1(II), JEFFAMINE D-2000 and pTMP were added rather than the PolyTHF alone. Likewise for example 1(III), the polypropylene glycol, JEFFAMINE D-2000, and pTMP were added and PolyTHF was not added. Also for 1(II) and 1(III), 1,4-butanediol was added in preparing the polyurethane resin.

Example 1
Part B Anionic Pigment Dispersing Resin

The following weight parts were combined:

| Material | Amount in grams |
|---|---|
| Polymeg ® 2000[7] | 131.0 |
| Fomrez ® 55–56[8] polyester | 131.0 |
| 1-methyl-2-pyrrolidinone | 160.7 |
| neopentyl glycol | 10.2 |
| Dimethylolpropionic acid | 54.1 |
| Desmodur ® W[9] polyisocyanate | 235.1 |

[7]poly(tetramethylene ether) glycol, Mw. = 2,000, available from Great Lakes Chemical Corp., West Lafayette, Indiana.
[8]hydroxy terminated polyester, hydroxyl number 56, available from Witco Corporation, Endicott, New York.
[9]methylene-bis-(4-cyclohexyl) diisocyanate, available from Bayer Corporation, Pittsburgh, Pennsylvania.

Materials 1–5 in the order and amounts indicated were charged to a reaction vessel. The mixture was then heated to 54° C. Desmodur®W polyisocyanate and 1-methyl-2-pyrrolidinone (19.0 g) were then added to the reactor at a rate such that the temperature did not exceed 85° C. After the addition of the polyisocyanate was complete, butanol (2.7 g) and dibutyltindilaurate (0.6 g) were added to the reactor. The solution was held at 85 to 90° C. until a stalled isocyanate advancement was achieved (<15 units/hr., theory isocyanate equivalent weight=1,560). After the isocyanate (NCO) advancement stalled, the resin was dispersed into deionized water (992.9 g), dimethylethanol amine (35.0 g), and ethylene diamine (15.0 g) and the dispersion was held at 75° C. for 30 minutes. After the 30-minute hold, the dispersion was cooled to 50° C. At 50° C., deionized water (38.8 g) and propylene imine (6.5 g) were added. The dispersion was then heated to 60° C. and held at this. temperature for four hours before cooling to room temperature.

Example 1
Part C: Anionic Polyurethane Pigment Paste
Part CI: Preparation of Neutralized Acid Catalyst:

Two neutralized acid catalyst formulations were made. For Example 1 Part CI(1) an amount of 284.93 grams dinonylnaphthalene sulfonic acid, Nacure 1051, available as a fifty percent dinonylnaphthalene sulfonic acid in ethyleneglycolmonobutylether, from King Industries of Norwalk, Conn., were mixed with 30.32 grams of dimethylethanolamine. This gives a neutralized acid catalyst intermediate with a calculated solids of 45.19 weight percent. For Example 1 Part CI(2) 60.0 grams of dinonylnaphthalene sulfonic acid solution, Nacure 1051 and 6.68 grams of triethylarmine were mixed together and diluted with 511.7 grams of deionized water to give a neutralized catalyst dispersion with a calculated solid of 5.19%.

Part CII: Preparation of Pigment Paste

The following two pigment paste formulations were prepared with the listed materials in amounts as parts by weight. These materials were mixed with a Cowles blade and then dispersed with conventional pigment dispersing equipment to a Hegman reading of 7.5+:

|  | CII(1) | CII(2) |
|---|---|---|
| Solvent free acrylic grind resin[10] | — | 212.2 |
| Acid catalyst of Example 1CI(1) | 55.1 | — |
| Anionic Pigment Dispersing Resin of Example 1B | 766.4 | — |
| triethylamine | — | 17.5 |
| Carbon Black[11a(11b)] | 27.9 | 15.5 |
| Titanium Dioxide[12a(12b)] | 634.7 | 634.7 |
| Transparent Red Iron Oxide[13] | 74.6 | 84.9 |

-continued

|  | CII(1) | CII(2) |
|---|---|---|
| Phthalo Blue[14] |  | 9.4 | 10.6 |
| Deionized water | 200 | 480 |

[10]Resin prepared with materials as described in Example A of U.S. Pat. No. 5,530,043 to 100 percent solids.
[11a]Raven 410 and [11b]Raven 1200 both available from Columbian Chemicals Company, Atlanta, Georgia.
[12a]R-900 and [12b]R-960-38 both available from DuPont de Nemours Company, Delaware.
[13]1030-AC-1005 available from Cookson Matthey of Jacksonville, Florida.
[14]248-0061 available from Sun Chemical, Inc., Linden, New Jersey.

For Example CII(1) after dispersion, the dispersing mill was rinsed with a small amount of deionized water. The resulting pigment paste had a measured solids (60 minutes at 110° C.) of 57.3 percent.

Example 1
Part D: Preparation of Electrodepositable Thermosetting Anionic Polyurethane Formulations The following formulations were made using polyurethane backbones from Example 1 Part A as indicated in Table 2, crosslinkers, and modifiers:

TABLE 2

|  | All PolyTHF | Blend of polyTHF and Jeffamine | All poly PPO (polypropylene-oxide) | All polyTHF resin plus free PPO triol |
|---|---|---|---|---|
| Formulation | D1 | D2 | D3 | D4 |
| Resin from Example 1A (80% solids in MIBK) | (I) | (II) | (III) | (I) |
| Amount of 1A Resin | 268.8 | 268.8 | 268.8 | 237.5 |
| Cymel 1135[15] | 20 | 20 | 20 | 20 |
| Cymel 1123[16] | 15 | 15 | 15 | 15 |
| Polypropyleneoxide triol[17] | — | — | — | 25 |
| Dimethylethanolamine | 3.83 | 3.83 | 3.83 | 3.83 |
| Deionized water | 550 | 550 | 550 | 550 |
| Amount of flexibilizing segment | 47.2 | 49.2 | 49.2 | 52.0 |
| Ratio Polytetrahydrofuran to polypropylene oxide | ∞ | 1.65/1 | 0 | 4.06 |

[15]methoxy/n-butoxy melamine formaldehyde resins available from Cytec Industries Inc. West Patterson, New Jersey.
[16]methylated ethylated benzoguanamine resins available from Cytec Industries Inc.
[17]LHT-240, 720 molecular weight polyropyleneoxide triol available from Arco Chemical Co. of Newton Square, Pennsylvania.

Formulations D1–D4 were Made Using the Following Procedure:

The resin, crosslinkers, and amine were weighed into a quart sized stainless steel beaker, and the beaker placed in a water bath maintained at 80° C. The mixtures were stirred with an air motor and flat pitched propeller blade until homogeneous. Under continuous stirring, 550 grams of deionized water was added slowly to form an aqueous dispersion. After forming the aqueous dispersion, the heat to the water bath was turned off, and the mixtures were allowed to cool. The mixtures were transferred to open one gallon plastic containers and stirred overnight with magnetic stirring bars. After stirring overnight to allow most of the ketone solvent to evaporate, an additional 3490 grams of deionized water, along with 75.1 grams of pigment paste from Example 1 Part CII(1) were added to complete the electrocoat bath formulations.

The calculation of the amount of flexibilizing segment in Table 2 of Example 1 Part D was determined in the following manner. The weights of the active hydrogen-containing polymers are summed. Accordingly, the weights of the following molecules are summed: polytetrahydrofuran, polyether diols, polyether diamines and polyether plasticizers. For the total resins solids, all materials contributing to resin solids are summed, with the proviso that for the Cymel 1123 and Cymel 1135 amine-formaldehyde resins, a weight loss upon curing is estimated. A weight loss for both Cymel 1123 and Cymel 1135 is estimated to be 20%, giving them estimated solids in a baked film of 80%.

As a sample calculation of flexibilizing segment content, the calculation for Formulation D1 is as follows:

| Solid resin materials from resin | 215 grams |
|---|---|
| Cymel 1135 (20 grams × .8) | 16 grams |
| Cymel 1123 (15 grams × .8) | 12 grams |
| Total | 243 grams |

Flexibilizing segments: 215 grams of resins solids ×53.34% Polymeg 100=114.7 grams of Polymeg 1000. 114.7/243= 47.2% as the amount of flexibilizing segment. The other amounts of flexibilizing segment for the other formulations were calculated in a like manner.

The determination of the weight loss upon curing of amine-formaldehyde resins can depend on many factors such as bake schedule, amount of acid catalysis, and amount of available co-reactants. Nevertheless, but can be estimated from a supplier's reported range of equivalent weight. The equivalent weight of Cymel 1123 is reported to range from 130 to 190 grams per mole of reaction site. The molecular weight of Cymel 1123 benzoguanamine monomer is estimated as 391 by assuming equal moles of the alkylation alcohols, methanol and ethanol. Calculating a weight loss for two moles of methanol yields a calculated weight loss of 15.8%. Calculating a weight loss for two moles of methanol and one mole of ethanol yields a calculated weight loss of 27.4%. The calculations are only rough estimates of how an amine-formaldehyde resin will cure in a particular formulation. An estimate of 20% weight loss is applied to both Cymel 1123 and Cymel 1135 in the examples.

Example 2 and 3

Two thermosetting anionic polyurethane electrodepositable compositions were prepared from the formulations shown in Table 3 where the amounts of the components are given in parts by weight.

TABLE 3

| Charge | Material | Example 2 | Example 3 |
|---|---|---|---|
| 1 | Isophoronediisocyanate | 922.4 | 461.6 |
| 2 | Dibutyltindilaurate | 0.55 | 0.28 |
| 3 | MIBK | 253.7 | 90.2 |
|  | Hold Temperature ° C. | 70 | 50 |
| 4 | Polymeg 1000 | 953.3 | 586.8 |
| 5 | MIBK | 238.3 | 146.7 |
| 6 | 1,4 butanediol | 57.3 | 12.8 |
| 7 | MIBK | — | 11.3 |
| 8 | Jeffamine D-2000 | 220.5 | 110.3 |
| 8A | MIBK | 15 | 7.5 |
| 9 | Dimethylolpropionic acid | 156.3 | 78.9 |
| 10 | MIBK | 127.5 | 7.5 |
| 10A | propylene glycol | 83.9 | 21.8 |

TABLE 3-continued

| Charge | Material | Example 2 | Example 3 |
|---|---|---|---|
| 11 | Propoxylated trimethylolpropane (pTMP) | 356.9 | — |
| 11 | Trimethylolpropane | — | 125.9 |
| 12 | MJBK | 71.1 | 75 |
| 13 | MIBK | 69.9 | 11.3 |
| 14 | Dimethylethanolamine | 52 | — |
| 14A | Triethylamine | — | 44.6 |
| 15 | Paraplex WP-1 | — | 73.6 |
| 15A | Cymel 1123 | 191.9 | — |
| 16 | Cymel 1135 | 256.2 | — |
| 16A | Cymel 1170 | | 370.1 |
| 17 | deionized water | 2637.4 | 1536.6 |
| 18 | deionized water | 2475.14 | 1180.9 |

[18]Propoxylated cresol plasticizer available from C.P. Hall Company, Chicago, Illinois.

Preparation of Anionic Polyurethane Formulation Stripped of Solvent

For Examples 2 and 3, the components listed in Table 3 were a similar manner. Any difference for Example 3 from Example 2 is indicated in the following description. The isophoronediisocyanate, dibutyltindilaurate, and MIBK were charged to a reaction vessel. The mixture was heated to 70° C. (50° C.) under a nitrogen blanket with agitation. The POLYMEG® 1000, MIBK, 1,4-butanediol and JEFFAMINE® D-2000 were added slowly, at a rate that kept the reaction temperature at or below 90° C. For Example 3 the JEFFAMINE® D-2000 was added slowly with a MIBK rinse to the three other materials after they were combined at a rate to keep the temperature below 90° C. along with an MIBK rinse and held at 75° C. for 27 minutes. For Example 2 an MIBK rinse was also subsequent to the addition of JEFFAMINE D-2000 polyamine. The reaction was held at 75° C. for 60 (27) minutes. An isocyanate equivalent weight (eq. wt.) of 556 (570) was obtained. Dimethylolpropionic acid was added followed by a rinse of MIBK, and the reaction mixture heated to 88° C. When the isocyanate eq. wt. reached 1185, propylene glycol, and propoxylated trimethylolpropane, for Example 2, or trimethylolpropane, for Example 3, and MIBK were added to the reaction mixture followed by a rinse with MIBK. The reaction mixture was held at 100° C. until the isocyanate was consumed (as determined by IR).

For Example 2, the reaction mixture was cooled to 93° C. For Example 3 the reaction was discontinued over night and heated the next day to 95° C. Dimethylethanolamine, and either Cymel® 1123 and Cymel® 1135 (or for Example 3 Paraplex WP-1 and Cymel® 1170) were added and mixed for 10 minutes. For Example 2, the first addition of deionized water was made over one hour, and the dispersion was cooled to 60° C. This temperature was held for 30 minutes before the second addition of deionized water was made over 60 minutes while maintaining a temperature of 60° C. For Example 3 the first addition of deionized water was made to 93% of the above reaction over 34 minutes and the reaction was allowed to mix for 24 minutes. The second addition of deionized water was made over 47 minutes. Both dispersions were vacuum stripped at 60° C. to remove solvent.

For Example 2 the composition was filtered and adjusted with deionized water to a solids content of 34.1 (35.1 weight percent for Example 3). For Example 2, 953.2 grams of this filtered resin was blended with 97.63 grams of the pigment paste of Example 1 Part CII(1) and 2.75 liters of deionized water to complete the electrocoat bath formulation.

For Example 3 the anionic thermosetting polyurethane electrodepositable composition was prepared from the polyurethane of Example 3 and the catalyst dispersion of Example 1 Part CI(2) and the pigment paste of Example CII(2). This was performed under continuous agitation from a magnetic stirring bar in a plastic, one gallon sized container. 880.7 grams of the polyurethane resin of Example 3 was diluted with 1.5 liters of deionized water and mixed with 24.66 grams of the catalyst dispersion of Example 1 Part CI(2), diluted with 100 grams of deionized water, 70.5 grams of the pigment paste of Example 1 Part CII(2), diluted with 50 grams of deionized water. Deionized water was added to increase the volume of the electrocoat bath to 3.5 liters, completing the formulation.

Example 4

Preparation of Cationic Thermosetting Polyurethane Electrodepositable Composition Example 4

Part A: Preparation of Cationic Polyurethane Resin

Isophoronediisocyanate (1200.6 g, 10.82 eq.), methylisobutyl ketone (520.2 g), and dibutyltindilaurate (0.6 g) were charged to a round bottom flask. The mixture was heated to 30° C. Trimethylpropane (125.1 g, 2.80 eq.) was then added to the solution. After the addition, the temperature rose to 73° C. Caprolactam (382.9 g, 3.38 eq.) and MIBK (40.0 g) were added to the flask. The mixture was maintained at 85° C. until an isocyanate (NCO) eq. wt. of 490 was obtained. TERETHANE®650, polytetrahydrofuran of 650 molecular weight available from DuPont. "PolyTHF" (707.9 g, 2.21 eq.) and MIBK (275.7 g) were then added to the flask. The addition was made at a rate such that the temperature was maintained below 90° C. After the addition was complete, the temperature was allowed to drift down to 65° C. At 65° C., JEFFAMINE®D-2000 (437.0 g, 0.44 eq.), and MIBK (40.0 g) were added and the mixture was held for 15 minutes. After the hold, an NCO eq. wt. of 1974 was obtained. Diethanolamine (87.0 g, 0.83 eq.) and 125 g aminopropyldiethanolamine (125.2 g, 0.77 eq.) were then added to the reaction mixture. The solution was held at 80° C. until no NCO was present as determined by IR analysis. After the isocyanate was consumed, 31 g SURFYNOL® GA surfactant (30.7 g) and MIBK (40.0 g) were added and the solution was mixed for 15 minutes. The resin was then dispersed into deionized water (1,666.0 g) and dimethylolpropionic acid (82.9 g, 0.62 eq). The resin was further thinned with deionized water (3,303.0 g), resulting in a final dispersion at 36.5% solids. The dispersion was subsequently vacuum stripped at 60° C. to remove solvent.

Example 4

Part B

The following materials were mixed with a Cowles blade and then dispersed with conventional pigment dispersing equipment to a Hegman reading of 7+:

| | |
|---|---|
| Epoxy grind resin[19] | 1466.1 |
| Deionized water | 294.7 |
| Titanium Dioxide[20] | 1166.4 |
| Transparent Red Iron Oxide[21] | 137.2 |
| Phthalo Blue[22] | 17.2 |
| Carbon Black[23] | 51.5 |

[19]Sulfonium-quaternary ammonium type described in U.S. Pat. No. 5,130,004 (PPG Industries, Inc., Johnson & McCollum) with a solids content of 31.2 percent.
[20]See footnote 11a.
[21]See footnote 12.
[22]See footnote 13.
[23]See footnote 10a.

The resulting pigment paste had a calculated solid content of 58.4 weight percent.

Example 4

Part C: Cationic Polyurethane Electrocoat Composition 1067.9 grams of the resin of Example 4 Part A was blended with 105.8 grams of the pigment paste of Example 4 Part B and diluted with water to a total volume of 3.8 liters.

Example 5

Preparation of a Cationic Thermosetting Polyurethane Electrodepositable Composition A resin was prepared from the following ingredients.

| Ingredients | Solution weight (grams) |
| --- | --- |
| Dibutyltindilaurate | 0.78 |
| Isophorone Diisocyanate | 1665.0 |
| Methylisobutyl Ketone | 520.0 |
| Trimethylol Propane | 232.0 |
| Terethane 650[24] | 1010.9 |
| Methylisobutyl Ketone | 302.7 |
| Caprolactam | 402.4 |
| Methylisobutyl Ketone | 50.0 |
| Jeffamine D2000 | 631.5 |
| Methylisobutyl Ketone | 50.0 |
| Aminopropyldiethanolamine | 294.5 |
| Methylisobutyl Ketone | 40.0 |
| Tinuvin 900[25] | 5.3 |
| Methylisbutyl Ketone | 5.3 |
| Tinuvin 123[26] | 5.3 |
| Methylisobutyl Ketone | 5.3 |
| Dimethylolpropionic Acid | 137.6 |
| Deionized Water | 2614.7 |
| Deionized Water | 797.3 |
| Deionized Water | 2192.7 |
| Deionized Water | 2325.6 |

[24]A polytetrahydrofuran resin of 650 molecular weight available from DuPont.
[25]ultraviolet light absorber available from Ciba-Geigy Corporation.
[26]A hindered amine light stabilizer available from Ciba-Geigy Corporation.

The dibutyltindilaurate, isophrone diisocyanate, and methylisobutyl ketone (520.0 gms.) were charged to a round-bottom flask and heated to 25° C. Trimethylolpropane was added, and the mixture was allowed to exotherm to 80° C. and held at that temperature for 15 minutes. The Terethane 650 and methylisobutyl ketone (302.7 gms) were added over 30 minutes, holding the temperature under 90° C., then holding the mixture at 80° C. for 15 minutes. The caprolactam and methylisobutyl ketone (50.0 gms) were added, allowed to exotherm to 90° C., then held at 90° C. for 2 hours. The mixture was cooled to 75° C., and the JEFFAMINE D-2000 and methylisobutyl ketone (50.0 gms) were added and held at 15 minutes at 70° C. The aminopropyldiethanolamine and methylisobutyl ketone (40.0 gms) were added and held for 30 minutes at 80° C. The Tinuvin 900 slurried with 5.3 gms MIBK, followed by the Tinuvin 123 slurried with 5.3 gms MIBK, were added and the mixture was held at 80° C. for 15 minutes. The mixture was then poured into a room temperature solution of dimethylolpropionic acid in deionized water (2614.7 gm), and stirred for 30 minutes. 797.3 gm more deionized water was added and stirred for 15 minutes. 2192.7 gm more deionized water was added and stirred for 15 minutes. 2329.6 gm. more deionized water was added and stirred for 15 minutes. The dispersion was vacuum stripped at 60° C. to remove solvent and deionized water was added back resulting in a final solids of 34.2%.

| Ingredients | Solution weight (grams) |
| --- | --- |
| 2-ethylhexanol half-capped toluene diisocyanate, 95% in MIBK | 320 |
| dimethylethanolamine (DMEA) | 87.2 |
| aqueous lactic acid solution, 88% | 117.6 |
| 2-butoxyethanol | 39.2 |

The 2-ethylhexanol half-capped toluene diisocyanate was added to the DMEA in a suitable reaction vessel at room temperature. The mixture exothermed and was stirred for one hour at 80° C. The aqueous lactic acid solution was then charged followed by addition of 2-butoxyethanol. The reaction mixture was stirred for about one hour at 65° C. to form the quaternizing agent.

The pigment grinding vehicle was prepared as follows:

| Ingredients | Solution weight (grams) |
| --- | --- |
| EPON 829[27] | 710 |
| Bisphenol A | 289.6 |
| 2-ethylhexanol half-capped toluene diisocyanate, 95% in MIBK | 320 |
| quaternizing agent described above | 496.3 |
| deionized water | 71.2 |
| 2-butoxyethanol | 1205.6 |

[27]Diglycidyl ether of Bisphenol A available from Shell Oil and Chemical Co.

The EPON 829 and Bisphenol A were charged under a nitrogen atmosphere to a suitable reactor and heated to 150 to 160° C. to initiate an exotherm. The reaction mixture was permitted to exotherm for one hour at 150 to 160° C. The reaction mixture was then cooled to 120° C. and the 2-ethylhexanol half-capped toluene diisocyanate added. The temperature of the reaction mixture was held at 110 to 120° C. for one hour followed by the addition of the 2-butoxyethanol. The reaction mixture was then cooled to 85 to 90° C., homogenized, and charged with water followed by the quaternizing agent. The temperature of the reaction mixture was held at 80 to 85° C. until an acid value of about 1 was obtained. The final product had a solids content of about 56.0%.

A dibutyltinoxide catalyst paste was prepared from the following ingredients.

| Ingredients | Solution weight (grams) |
| --- | --- |
| Dibutyltinoxide | 300.0 |
| Pigment Grinding Vehicle | 214.3 |
| Deionized Water | 398.1 |

The paste was sand-milled to a Hegman 7.

A pigment paste was prepared from the following ingredients.

| Ingredients | Solution weight (grams) |
| --- | --- |
| Epoxy Grind Resin[28] | 1582.4 |
| Deionized Water | 90.55 |
| Titanium Dioxide[29] | 278.75 |
| Transparent Yellow Iron Oxide[30] | 150.0 |

-continued

| Ingredients | Solution weight (grams) |
| --- | --- |
| Carbon Black[31] | 55.5 |
| Dibutyltinoxide Paste | 47.9 |

[28]Sulfonium-quaternary ammonium type described in U.S. Pat. No. 5,130, 004 with a solids content of 31.2%.
[29]Available from DuPont as R900.
[30]Available from Cookson-Matthey as Trans-Oxide Yellow GS 10-30-AC-0544.
[31]Available from Columbian Chemicals Co. as Raven 410.

The pigment paste was sand-milled to a Hegman 7.
A cationic electrodeposition bath was prepared from the following ingredients.

| Ingredients | Solution weight (grams) |
| --- | --- |
| Resin | 2309.2 |
| Pigment Paste | 210.7 |
| Deionized Water | 5080.1 |

Example 6
Preparation of a Cationic Thermosetting Polyurethane-Polyurea Resin A cationic polyurethane-polyurea resin was prepared from the following ingredients.

| Ingredients | Solution weight (grams) |
| --- | --- |
| Dibutyltindilaurate | 0.78 |
| Isophorone Diisocyanate | 1665.0 |
| Methylisobutyl Ketone | 545.0 |
| Trimethylol Propane | 267.8 |
| Caprolactam | 440.8 |
| Methylisobutyl Ketone | 25.0 |
| PMDA 1000[32] | 1016.0 |
| Methylisobutyl Ketone | 400.0 |
| JEFFAMINE D2-000 | 792.1 |
| Methyisobutyl Ketone | 50.0 |
| Aminopropyldiethanolamine | 305.3 |
| Methylisobutyl Ketone | 100.0 |
| Tinuvin 900[33] | 5.6 |
| Methylisbutyl Ketone | 5.0 |
| Tinuvin 123[34] | 5.6 |
| Methylisobutyl Ketone | 5.0 |
| Dimethylolpropionic Acid | 121.3 |
| Deionized Water | 2267.3 |
| Deionized Water | 717.4 |
| Deionized Water | 1972.7 |
| Deionized Water | 1409.1 |

[32]An amine terminated polytetramethylene glycol prepared by cyanoethylation followed by hydrogenation of polytetramethylene glycol polytetrahydrofuran resin of 1000 molecular weight; purchased from Air Products Corporation.
[33]An ultraviolet light absorber available from Ciba-Geigy Corporation.
[34]A hindered amine light stabilizer available irom Ciba-Geigy Corporation.

The dibutyltindilaurate, isophrone diisocyanate, and methylisobutyl ketone (545.0 gms.) were charged to a round-bottom flask and heated to 25° C. Trimethylolpropane was added, and the mixture was allowed to exotherm to 80° C. and held at that temperature for 1 hour. The caprolactone and methylisobutyl ketone (25.0 gms) were added and the mixture held at 85–90° C. for 2 hours at which point NCO equivalent weight was 575. The mixture was cooled to 75° C. and the PMDA 1000 was then added over 30 minutes controlling the temperature below 80° C., methylisobutyl ketone (400.0 gms) was added as a rinse. The mixture was then held at 80° C. for 15 minutes. The JEFFAMINE D-2000 and methylisobutyl ketone (50.0 gms) were added and held at 15 minutes at 80° C. The aminopropyldiethanolamine and methylisobutyl ketone (50.0 gms) were added and held for 30 minutes at 80° C. The Tinuvin 900 slurried with 5.3 gm MIBK followed by Tinuvin 123 slurried with 5.3 gm MIBK were added followed by and the mixture was held at 80° C. for 15 minutes. 4785 grams of the mixture was then poured into a room temperature solution of dimethylolpropionic acid in deionized water (2267.3 gm), and stirred for 30 minutes. 717.43 gm more deionized water was added and stirred for 15 minutes. 1972.7 gm more deionized water was added and stirred for 15 minutes. 1409.1 gm. more deionized water was added and stirred for 15 minutes. The dispersion was vacuum stripped at 60° C. to remove solvent and deionized water was added back resulting in a final solids of 34.2%.

Example 7
Testing of Elastomeric Electrocoat Composition

A cationic polyurethane electrocoat composition was prepared as described in Example 5 and was coated on various substrates, as indicated below.

TABLE 4

| Sample No. | Substrate | Cleaning | Pretreatment | Rinse | Primer-Electrocoat | Surfacer | Colorcoat | Topcoat |
| --- | --- | --- | --- | --- | --- | --- | --- | --- |
| 1 | EG steel 1[35] | N/A | BONDERITE 958[36] | PARCOLENE 60[37] | Elastomeric E-Coat[38] | N/A | BWB-9753[39] | WT-KR-2000[40] |
| 1a | EG steel 1 | N/A | BONDERITE 958 | PARCOLENE 60 | ED-5050B4 | GPX-99075[42] | BWB-9753 | WT-KR-2000 |
| 2 | EG steel 2[43] | N/A | CHEMFOS 700 1[44] | DI H$_2$O | Elastomeric E-Coat | N/A | BWB-9753 | WT-KR-2000 |
| 2a | EG steel 2 | N/A | CHEMFOS 700 1 | DI H$_2$O | ED-5050B | GPX-09975 | BWB-9753 | WT-KR-2000 |
| 3 | EG steel + CHROME + BONAZINC 3000[45] | CK-163[46] | CHEMFOS 700 2[47] | CHEMSEAL 59[48] (5%) | Elastomeric E-Coat | N/A | BWB-9753 | WT-Kk-2000 |

TABLE 4-continued

| Sample No. | Substrate | Cleaning | Pretreatment | Rinse | Primer-Electrocoat | Surfacer | Colorcoat | Topcoat |
|---|---|---|---|---|---|---|---|---|
| 3a | EG steel + CHROME + BONAZINC 3000 | CK-163 | CHEMFOS 700 2 | CHEMSEAL 59 (5%) | ED-5050B | GPX-09975 | BWB-9753 | WT-KR-2000 |
| 4 | 6022 A1[49] | CK-163 | CDX397[50] + NUPAL 4355[1] | N/A | Elastomeric E-Coat | N/A | BWB-9753 | WT-KR-2000 |
| 4a | 6022 A1 | CK-163 | CDX397 + NUPAL 435 | N/A | ED-5050B | GPX-09975 | BWB-9753 | WT-KR-2000 |
| 5 | 6022 A1 | CK-163 | None | N/A | Elastomeric E-Coat | N/A | BWB-9753 | WT-KR-2000 |
| 5a | 6022 A1 | CK-163 | None | N/A | ED5050B | GPX-09975 | BWB-9753 | WT-KR-2000 |
| 6 | CR Steel 1[52] | N/A | BONDERITE 958 | PARCOLENE 60 | Elastomeric E-Coat | N/A | BWB-9753 | WT-KR-2000 |
| 6a | CR Steel 1 | N/A | BONDERITE 958 | PARCOLENE 60 | ED-5050B | GPX-09975 | BWB-9753 | WT-KR-2000 |
| 7 | CR Steel 2[53] | N/A | CHEMFOS 700 1 | DI $H_2O$ | Elastomeric E-Coat | N/A | BWB-9753 | WT-KR-2000 |
| 7a | CR Steel 2 | N/A | CHEMFOS 700 1 | DI $H_2O$ | ED-5050B | GPX-09975 | BWB-9753 | WT-KR-2000 |

[35] An electrogalvanized steel panel available from ACT Laboratories, Hillsdale, Michigan. The panel is 4"× 12"× 0.030", pretreated with Bonderite 958, rinsed with Parcolene 60, ordering code APR22711.
[36] An immersion zinc phosphate pretreatment available from Parker-Henkel. This phosphate was applied at ACT Laboratories.
[37] A hexavalent chromium rinse available from Parker-Henkel. This rinse was applied at ACT Laboratories.
[38] The cationic polyurethane electrocoat composition of Example 5. The panels were immersed in the bath as a cathode, subjected to 250 volts of direct current at 95° F. (35° C.) for 2.5 minutes, then rinsed with deionized water and baked 30 minutes at 350° F. (176.7° C.). Resulting film build was 1.3 to 1.4 mils (33.0 to 35.6 microns).
[39] A white water-based spray colorcoat available from PPG Industries. It was reduced with deionized water to 25" No. 4 Ford Cup viscosity, spray-applied at 1.0 to 1.2 mils (25.4 to 30.5 microns), and flash-baked 5 minutes at 200° F. (93.3° C.).
[40] A two-pack urethane solvent-based spray clearcoat available from PPG Industries. It was reduced with 3-ethoxy ethylpropionate to 25" No. 4 Ford Cup viscosity, spray-applied over the flash-dried BWB-9753 at 2.0 to 2.2 mils (50.8 to 55.9 microns), and baked 30 minutes at 250° F. (121.1° C.).
[41] A lead-containing, corrosion-resistant cathodic electrocoat available from PPG Industries. The bath was prepared from 1748 parts E6214 (resin blend available from PPG Industries), 199 parts E6215 (paste available from PPG Industries), and 1853 parts deionized water. The bath was 21% solids and 0.14 to 1.0 pigment to binder ratio. It was ultrafiltered 20%, removing 20% permeate by ultrafiltration and replacing with deionized water. The panels were immersed in the bath as a cathode, subjected to 275 volts of direct current at 86° F. (30° C.) for 2 minutes, then rinsed with deionized water and baked 30 minutes at 340° F. (171.1° C.). Resulting film build was 0.9 to 1.0 mil (22.9 to 25.4 microns)
[42] A solvent-based spray primer-surfacer available from PPG Industries. It was reduced with aromatic solvent 100 from Exxon to 23" No. 4 Ford Cup viscosity, spray-applied over the baked ED5050B film at 0.9 to 1.1 mils (22.9 to 27.9 microns), and baked 30 minutes at 270° F. (132.2° C.).
[43] An electrogalvanized steel panel available from ACT Laboratories, Hillsdale, Michigan. The panel is 4" × 12" × 0.0030", pretreated with Chemfos 700, rinsed with deionized water, ordering code APR31611.
[44] An immersion zinc phosphate pretreatrnent available from PPG Industries, Pretreatment & Specialty Products, Troy, Michigan. This phosphate was applied at ACT Laboratories.
[45] Panels were 4" × 12" × 0.029", consisting of two-sided electrogalvanized steel treated with Granodine 4513, a proprietary chromate conversion coating from Parker-Henkel and 0.12 mil (3 microns) of mill-applied Bonazinc 3000, a conductive, zinc-rich epoxy-based coating available from PPG Industries in Europe as E108A114.
[46] An alkaline cleaner available from PPG Industries, Pretreatment & Specialty Products, Troy, Michigan. Panels were pretreated with 2% by volume CK163 spray at 145° F. (62.8° C.) for 60 seconds, followed by immersion rinse for 30 seconds in tap water at 120° F. (48.9° C.), followed by immersion rinse for 60 seconds in rinse conditioner at 100° F. (37.8° C.).
[47] An immersion zinc phosphate pretreatment available from PPG Industries, Pretreatment & Specialty Products, Troy, Michigan. The bath is prepared at 4.9% concentration of acidic component A, 2.7% concentration of basic component B, 10 ppm Fe added as ferrous sulfate, and 0.5 ml. of sodium nitrite per liter of bath. Panels were immersed for 120 seconds at 120° F. (48.9° C.), followed by immersion rinse for 30 seconds at ambient temperature in deionized water.
[48] An immersion rinse available from PPG Industries, Pretreatment & Specialty Products, Troy, Michigan. The bath contains fluorozirconic acid and triethanolamine as generally described in USP5209788. A supplied concentrate is diluted 1% by volume, then panels were immersed for 30 seconds at ambient temperature, followed by spray deionized water rinse and warrn air dry.
[49] An aluminum 6022 alloy panel 4" × 12" × 0.041" was cleaned by 2% by volume CK163 alkaline cleaner spray at 140° F. (60° C.) for 60 seconds, rinsed with deionized water for 30 seconds, immersed into CDX397 acid fluoride activator at 2000 ppm F at 70° F. (21.1° C.) for 120 seconds, immersed in 5% Nupal 435 solution at 70° F. (21.1° C.) for 30 seconds, immersed in deionized water for 30 seconds, rinsed with deionized water for 30 seconds, then dried with warm air at 110° F. (43.3° C.) for 2 minutes.
[50] An acid fluoride activator solution, containing 2000 ppm F and 4.5 gm./liter $Na_2SiO_3.5H_2O$, available from PPG Industries, Pretreatment & Specialty Products, Troy, Michigan.
[51] An aqueous phosphatized epoxy dispersion available from PPG Industries, Pretreatment & Specialty Products, Troy, Michigan. Preparation is as generally described in US Pat. No. 5,294,265.
[52] A cold-rolled steel panel available from ACT Laboratories, Hillsdale, Michigan. The panel is 4" × 12" × 0.032", pretreated with Bonderite 958, rinsed with Parcolene 60, ordering code APR14490.
[53] A cold-rolled steel panel available from ACT Laboratories, Hillsdale, Michigan. The panel is 4" × 12" × 0.032", pretreated with Chemfos 700, rinsed with deionized water, ordering code APR28630.

The treated substrates were subjected to chip-resistance and corrosion-resistance tests, as follows.

For Velociball testing, topcoated panels were stored in a freezer at −20° C. for at least two hours, and then shot with a 2 or 3 mm chrome steel ball at a velocity of 75, 95, or 155 miles per hour (121, 153, or 249 km/hour). The ball impacted the coated test panel at 90° C., or perpendicular to the surface. After removing from the freezer, raised and loosened portions of the paint system were removed with a sharp tool. The circle of damage was measured in millimeters and the results reported in diameter of damage.

The Gravel-O-Meter tests were performed according to the protocol described in SAE J400, rev. 1/85, and were run at 0° F. (−17.8° C.).

The cycle B corrosion tests were performed according to General Motors Engineering Standard 9540P, Method B.

The results of testing performed on Samples 1–14 may be found in Table 5, below.

TABLE 5

| Sample No. (a = Controls) | Velociball Diameter of Damage (mm) | | | | Corrosion Resistance | | |
|---|---|---|---|---|---|---|---|
| | 3 mm ball, 155 mph | 3 mm ball, 95 mph | 3 mm ball, 75 mph | 2 mm ball, 155 mph | Gravel-O-Meter Chip Resistance (10 = best) | 40 day Cycle B (mm creep) | 80 day Cycle B (mm creep) |
| 1 (EG1) | 2 | 1.75 | 1.5 | 2 | 8.25 | 0.5 | 0.5 |
| 1a | 6 | 4 | 3.5 | 3.75 | 6 | 0 | 0 |
| 2 (EG2) | 2 | 3 | 2.5 | 2.75 | 9 | 1 | 1 |
| 2a | 6.25 | 4 | 3.75 | 4 | 5.75 | 0 | 0.5 |
| 3 (EG + BONAZINC) | 2.5 | 3.75 | 2.5 | 3 | 9 | 0 | |
| 3a | 5.75 | 4 | 3 | 3 | 7 | 0 | 0.5 |
| 4 (A1 + NUPAL) | 0 | 0 | 0 | 0 | 9.5 | 0 | 0 |
| 4a | 0 | 0 | 0 | 0 | 9.25 | 0 | 0.5 |
| 5 (A1) | 0 | 0 | 0 | 0 | 9 | 0 | 0 |
| 5a | 0 | 0 | 0 | 0 | 8.5 | 0 | 0 |
| 6 (CR1) | 2 | 2 | 1.75 | 2 | 8.5 | 7.5 | 16 |
| 6a | 6 | 4 | 3.75 | 3.5 | 7 | 3.5 | 11 |
| 7 (CR2) | 2 | 3.5 | 3 | 3 | 8.25 | 11 | 25 |
| 7a | 6.25 | 3.5 | 3.5 | 3.5 | 6.75 | 4.75 | 13.5 |

These data indicate the feasibility of substituting a single layer of the elastomeric coating composition of the present invention for two layers of an electrocoat plus a primer/surfacer as is known in the art. The use of the composition of the present invention affords significant chip-resistance and does not significantly reduce corrosion resistance when applied to corrosion-resistant substrates (samples 1–5).

We claim:

1. A coated article, comprising:
   a. a corrosion-resistant electrically conductive substrate that is free of an electrodeposited coating; and
   b. an electrodeposited film-forming composition applied to at least a portion of a surface of the corrosion-resistant electrically conductive substrate, the film-forming composition comprising a curable electrodepositable elastomeric polymer, said polymer comprising the reaction product of
      a polyisocyanate, and
      an active hydrogen-containing polymer selected from
         a polyether polyamine, and/or
         a mixture of a polyether polyamine, and a polyester and/or a polyether polyol.

2. The coated article of claim 1 in which the corrosion-resistant electrically conductive substrate is selected from the group consisting of aluminum or alloys thereof, optionally coated with a non-insulating layer of a zinc-rich or iron phosphide-rich organic coating, and a zinc or zinc alloy surface treated steel, optionally coated with a non-insulating layer of a zinc-rich or iron phosphide-rich organic coating.

3. The coated article of claim 1 in which the polyether polyamine comprises a polyoxyalkylene polyamine or a mixture of a polyoxyalkylene polyamine and a polyoxyalkylene polyol.

4. The coated article of claim 1 in which the elastomeric polymer is essentially aliphatic.

5. The coated article of claim 1 wherein the corrosion-resistant electrically conductive substrate comprises aluminum or alloys thereof.

6. The coated article of claim 1 in which the polyisocyanate is an aliphatic or cycloaliphatic polyisocyanate.

7. The coated article of claim 1 in which the polyisocyanate is selected from the group consisting of isophorone diisocyanate, 1,6-hexamethylene diisocyanate, 4,4'-diisocyanatodicyclohexyl methane and isocyanurates thereof.

8. The coated article of claim 1 in which the polyether polyamine is selected from the group consisting of a polyoxytetramethylene diamine, a polyoxypropylene polyamine, a polyoxyethylene polyamine and mixtures thereof.

9. The coated article of claim 1 in which the polyether polyamine is (A) a polyoxytetramethylene diamine.

10. The coated article of claim 9 in which the polyether polyamine further comprises (B) a polyoxypropylene polyamine.

11. The coated article of claim 10 in which the weight ratio of (A) to (B) ranges from 0.5 to 10:1.

12. The coated article of claim 1 in which the polyether polyamine comprises a mixture of (i) a polyoxytetramethylene diamine and (ii) at least one of a polyoxypropylene diamine and a polyoxyethylene diamine in which the weight ratio of (i) to (ii) ranges from 0.5 to 10:1.

13. The coated article of claim 1 in which the polyether polyamine is selected from the group consisting of polyoxypropylene diamines, polyoxyethylene-propylene diamines and polyoxytetramethylene diamine.

14. The coated article of claim 1 in which the polyether polyamine has a glass transition temperature of 0° C. or less and a number average molecular weight ranging from 400 to 4000.

15. The coated article of claim 1 in which the polyether polyamine is present in the elastomeric polymer in an amount of at least 30 percent by weight of reactants used to make the elastomeric polymer.

16. The coated article of claim 1, in which the curable elastomeric polymer comprises the reaction product of i) a polyisocyanate, ii) a polyether polyamine having a number average weight greater than 400, and iii) an active hydrogen-containing compound having a number average molecular weight below 400.

17. The coated article of claim 1 in which the elastomeric polymer contains active hydrogens and the electrodeposited film-forming composition further comprises a curing agent having groups that are reactive with the active hydrogens.

18. The coated article of claim 17 in which the curing agent is selected from the group consisting of an aminoplast and a capped polyisocyanate.

19. The coated article of claim 17 in which the curing agent is a capped polyisocyanate which is capped with a capping agent selected from the group consisting of caprolactam and dibutylamine.

20. The coated article of claim 17 in which the curing agent is a capped polyisocyanate that is provided integral with the elastomeric polymer backbone.

21. The coated article of claim 1 in which the elastomeric polymer contains active hydrogen-containing groups and ionic salt groups or groups that can be converted into ionic salt groups.

22. The coated article of claim 21 in which the ionic salt groups or groups that can be converted into an ionic salt group are selected from the group consisting of carboxyl groups and amino groups.

23. The coated article of claim 1 in which the film-forming composition further comprises an opacifying pigment.

24. The coated article of claim 23 in which the opacifying pigment is selected from the group consisting of non-transparent iron oxides and transparent iron oxides.

25. The coated article of claim 1 in which the film-forming composition further comprises a hindered amine light stabilizer.

26. The coated article of claim 1 in which the film-forming composition is a cationic electrodepositable film-forming composition.

27. The coated article according to claim 1, wherein the coated article further comprises a non-insulating layer of a corrosion-resistant coating positioned between the electrically conductive substrate and the coating composition.

28. The coated article of claim 1 in which at least a portion of the corrosion-resistant substrate is zinc or zinc alloy surface treated steel.

29. The coated article of claim 28 in which at least a portion of a surface of the substrate is coated with a non-insulating layer of a zinc-rich or iron phosphide-rich organic film-forming composition.

30. The coated article of claim 29 in which at least a portion of a surface of the substrate is further treated with a zinc phosphate pretreatment solution.

31. The coated article of claim 29 in which at least a portion of a surface of the substrate is coated with non-insulating layer of a corrosion-resistant coating comprising a Group IIIB or IVB metal compound or mixtures thereof.

32. The coated article of claim 28 in which at least a portion of a surface of the substrate is treated with a zinc phosphate pretreatment solution.

33. The coated article of claim 28 in which at least a portion of a surface of the substrate is coated with a non-insulating layer of a corrosion-resistant coating comprising a Group IIIB or IVB metal compound or mixtures thereof.

34. The coated article of claim 1 in which at least a portion of the corrosion-resistant substrate is aluminum or an alloy thereof.

35. The coated article of claim 34 in which at least a portion of the surface of the substrate is coated with a non-insulating layer of a phosphatized epoxy composition.

36. The coated article of claim 34 in which at least a portion of the surface of the substrate is coated with a non-insulating layer of a zinc-rich or iron phosphide-rich organic film-forming composition.

37. The coated article of claim 36 in which at least a portion of the surface of the substrate is further coated with a non-insulating layer of a phosphatized epoxy composition.

38. The coated article of claim 36 in which at least a portion of a surface of the coated substrate is further treated with a zinc phosphate pretreatment solution.

39. The coated article of claim 34 in which at least a portion of a surface of the substrate is treated with a zinc phosphate pretreatment solution.

40. The coated article of claim 1 in which one or more additional film-forming layers is applied to an exposed surface of the layer comprising the electrodeposited film-forming composition.

41. The coated article of claim 1 in which the cured electrodeposited film-forming composition includes at least 0.5 meq polyurea linkages per gram of cured film.

42. The coated article of claim 1 in which the cured electrodeposited coating composition includes at least 0.6 meq polyurea linkages per gram of cured film.

43. The coated article of claim 1 in which the cured electrodeposited coating composition includes at least 1.0 meq polyurea linkages per gram of cured film.

* * * * *